(12) United States Patent
Bryant-Rich

(10) Patent No.: US 8,412,905 B2
(45) Date of Patent: Apr. 2, 2013

(54) STORAGE SYSTEM HAVING SECONDARY DATA STORE TO MIRROR DATA

(75) Inventor: Donald Ray Bryant-Rich, Haifa (IL)

(73) Assignee: Sandisk IL Ltd., Kfar Saba (IL)

( * ) Notice: Subject to any disclaimer, the term of this patent is extended or adjusted under 35 U.S.C. 154(b) by 811 days.

(21) Appl. No.: 12/348,005

(22) Filed: Jan. 1, 2009

(65) Prior Publication Data

US 2010/0169595 A1    Jul. 1, 2010

(51) Int. Cl.
*G06F 12/00* (2006.01)
*G06F 13/00* (2006.01)
*G06F 13/28* (2006.01)

(52) U.S. Cl. . 711/170; 711/161; 711/162; 711/E12.001; 711/E12.002; 711/E12.103

(58) Field of Classification Search ................. None
See application file for complete search history.

(56) References Cited

U.S. PATENT DOCUMENTS

| | | | |
|---|---|---|---|
| 6,412,080 B1 | 6/2002 | Fleming et al. | |
| 6,553,360 B1 * | 4/2003 | Hoekstra | 706/47 |
| 6,611,836 B2 * | 8/2003 | Davis et al. | 1/1 |
| 6,636,953 B2 * | 10/2003 | Yuasa et al. | 711/161 |
| 6,948,026 B2 * | 9/2005 | Keays | 711/103 |
| 7,055,059 B2 * | 5/2006 | Yanai et al. | 714/6.32 |
| 7,136,903 B1 | 11/2006 | Phillips et al. | |
| 7,146,476 B2 | 12/2006 | Sandorfi et al. | |
| 7,146,525 B2 | 12/2006 | Han et al. | |
| 7,155,465 B2 | 12/2006 | Lee et al. | |
| 7,159,074 B2 * | 1/2007 | Kihara et al. | 711/114 |
| 7,171,472 B2 | 1/2007 | O'Brien et al. | |
| 7,502,891 B2 * | 3/2009 | Shachor | 711/137 |
| 2002/0083064 A1 * | 6/2002 | Davis et al. | 707/100 |
| 2004/0073831 A1 * | 4/2004 | Yanai et al. | 714/7 |
| 2004/0268070 A1 * | 12/2004 | Hasegawa | 711/162 |
| 2005/0273476 A1 * | 12/2005 | Wertheimer et al. | 707/204 |
| 2006/0288044 A1 * | 12/2006 | Kashiwagi et al. | 707/200 |
| 2007/0185936 A1 | 8/2007 | Derk et al. | |
| 2007/0192553 A1 * | 8/2007 | Otani et al. | 711/162 |
| 2007/0240006 A1 * | 10/2007 | Fung | 713/323 |
| 2007/0260833 A1 * | 11/2007 | Nagata et al. | 711/162 |
| 2007/0277010 A1 * | 11/2007 | Anand et al. | 711/162 |
| 2008/0022061 A1 * | 1/2008 | Ito et al. | 711/162 |
| 2008/0168245 A1 * | 7/2008 | De Atley et al. | 711/162 |
| 2008/0282024 A1 * | 11/2008 | Biswas et al. | 711/103 |
| 2009/0198883 A1 * | 8/2009 | Fortin et al. | 711/112 |
| 2010/0205154 A1 * | 8/2010 | Beliczynski | 707/665 |

OTHER PUBLICATIONS

Patterson et al., "A Case for Redundant Arrays of Inexpensive Disks (RAID)", 1988, Association for Computing Machinery (ACM), 0-89791-268-3/88/0006/0109, pp. 109-116.*

* cited by examiner

*Primary Examiner* — Edward Dudek, Jr.
*Assistant Examiner* — Matthew Chrzanowski
(74) *Attorney, Agent, or Firm* — Brinks Hofer Gilson & Lione

(57) ABSTRACT

A storage system includes a secondary data store for backing up the primary data store, a deleted data store for retention of deleted data, and a data management application for managing the backing up of stored and deleted data of the primary data store. The deleted data store may be either separate from the secondary data store or implemented within the secondary data store. The data management application may automatically free up space for backup of data newly added to or deleted from the primary data store, by selectively removing data from the deleted data store, based application of appropriate criteria.

16 Claims, 11 Drawing Sheets

STORAGE SYSTEM HAVING SECONDARY DATA STORE TO MIRROR DATA

FIELD OF THE INVENTION

The present invention relates generally to storage backup and particularly to remote backup storage of both stored and deleted data with automatic storage management.

BACKGROUND

Transient storage devices, such as USB flash drives (UFDs) and removable hard drives, are useful for storing data to be transferred between multiple personal computers. However, unlike personal computers, transient storage devices usually do not have recovery systems for deleted files. Nor does a personal computer typically provide backup for a transient storage device operationally connected thereto. A personal computer typically has a system in place to move deleted files to a portion of the hard disk (a recycle bin) if the files were stored in the internal hard drive but not if the files were stored in a peripheral UFD. Accordingly, the recycle bin retains for future recovery the files that were originally stored in the internal hard drive, but the files that were deleted from the UFD are unrecoverable.

Although a recycle bin may be implemented within a transient storage device, any space allocated for the deleted files would reduce the space available for storing new files. For storage devices with limited space, the user must choose between maximizing the space available for new files and allocating space for permitting recovery of deleted files. Accordingly, transient storage devices generally do not implement recycle bins, and deleted files are unrecoverable. A user unintentionally deleting a file is unable to reverse the deletion.

Thus, it would be desirable to have a backup system in place for files stored on transient storage devices without having to sacrifice the limited storage thereon.

SUMMARY

The present inventor has developed devices and processes that may be used to back up both stored and deleted data from a data store (hereafter "primary data store") of, e.g., a transient storage device, without sacrificing space for storing data. Thus, the full storage capacity of the device may be made available for storing data, while also fully backing up the data stored on the device and providing for recovery of data deleted from the device. Embodiments of the invention may include a secondary data store for backing up the primary data store, a deleted data store (which may also be referred to as a recycle bin) for retention of deleted data, and a data management application for managing the backing up of stored and deleted data of the primary data store. It is noted that the embodiments disclosed herein are not necessarily limited to application to a transient storage device, but may be used to provide storage backup (of both stored and deleted data) for other types of storage devices, such as may embody various types of storage or memory, as will be understood by one of ordinary skill in the art.

The deleted data store may be either a data store separate from the secondary data store ("separate" or "separated" deleted data storage), in which case the secondary data store may have the same capacity as (or a greater capacity than) the primary data store, or the deleted data store may be implemented within the secondary data store ("integrated," "combined," or "shared" deleted data storage), in which case the secondary data store may have greater capacity than the primary data store, which permits mirroring all the data of the primary data store when the primary data store is full while still providing space for storing data deleted from the primary data store.

The data management application may manage the backing up, in the secondary data store, of data stored in the primary data store; the backing up, in the deleted data store, of data deleted from the primary data store; the transfer of data to the deleted data store upon deletion of data from the primary data store; and the removing of data from the deleted data store as dictated by the storage capacity limits of the deleted data store (applicable to the cases of both the separate deleted data storage and the integrated deleted data storage) and/or to provide adequate space in the secondary data store (as will be explained below) to permit the backing up therein of data to be added to the primary data store (applicable to the case of the integrated deleted data storage). The data management application may automatically provide a safety net of free space for backup of data newly added to or deleted from a primary data store, by selectively removing data (previously deleted data) from the deleted data store, by application of appropriate specific criteria. Automatically removing previously deleted data, together with other features described herein, reduces the need for the user of the primary data store to manage the data in the deleted data store and accordingly provides significant convenience for the user. As users typically do not wish to perform such management and in fact avoid performing such management (other than as needed to restore lost data from a backup), this feature together with other features described herein is understood to provide an important advantage.

Example embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein;

Where suitable, the same or like reference numbers are used in multiple drawings to refer to the same or like elements.

DETAILED DESCRIPTION

The following detailed description and accompanying drawings are intended to be illustrative only and not limiting of the present invention, it being understood that only certain example embodiments are described and shown herein.

The structure and operation of storage systems and methods according to various example embodiments of the present invention will now be described.

Figure 1A:
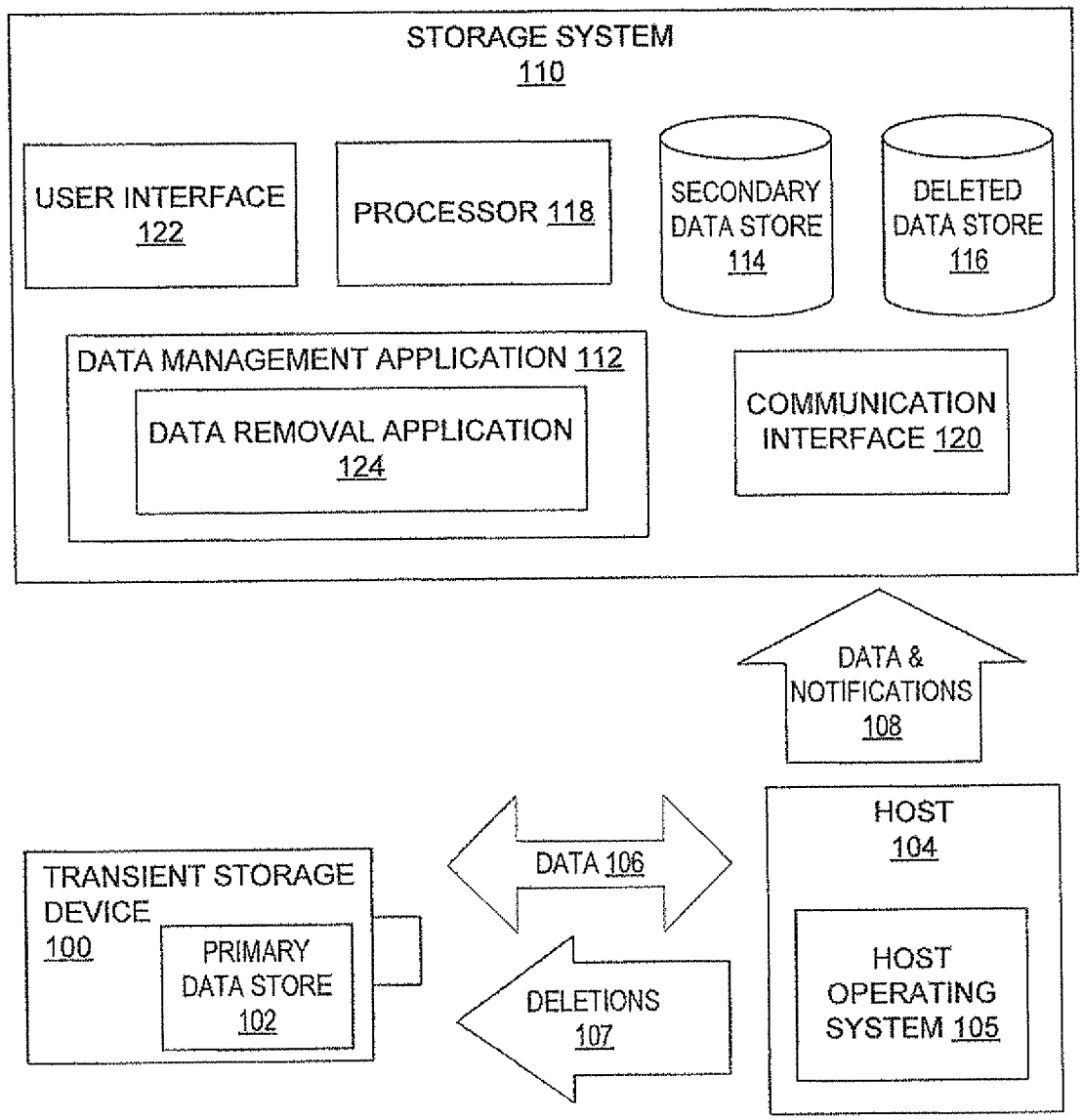
FIGS. 1A and 1B illustrate storage systems according to example embodiments of the present invention, together with other elements in conjunction with which storage systems may operate.

It is expected that embodiments disclosed herein may be used in conjunction with a transient storage device, a host and/or a network, although none of these elements is required. (The term "transient storage device" refers to a (e.g. mass) storage device that is removable from a host.) Accordingly, FIG. 1A illustrates an embodiment of a storage system together with other elements in conjunction with which it may operate. As shown in FIG. 1A, a transient storage device 100 includes a primary data store 102. Exemplary transient storage devices in the context of the present disclosure include a USB flash drive (UFD), removable hard disk, memory card, etc. The primary data store may be a non-volatile memory such as NAND FLASH or memristor memory (e.g., in USB flash drives or external solid state drives) or magnetic storage media (e.g. in external hard drives), but other types of storage media may be used for the primary data store, as will be understood by one of ordinary skill in the art in view of the description given herein.

Examples of hosts in the context of the present disclosure include a personal computer, a smart phone, and a personal information device but the embodiments disclosed herein are also applicable to other types of hosts, as will be understood by one of ordinary skill in the art in view of the description herein. As shown in FIG. 1A, a host 104 includes an operating system 105 responsible for transferring 106 data to and from transient storage device 100, deleting 107 data from transient storage device 100, and transferring 108 data and notifications of deletions and/or additions of data to a storage system 110, allowing for the backup, on storage system 110, of files stored on and deleted from transient storage device 100. (It is noted that the term "back up" and the like are used in the present disclosure with reference to maintaining copies of both stored data and deleted data.)

Storage system 110 includes a data management application 112, a secondary data store 114, a deleted data store 116, a processor 118, a communication interface 120, a user interface 122, and data and control lines therebetween (not shown). Data management application 112 includes one or more sub-applications, including a data removal application 124. These applications and sub-applications are executed by processor 118 to carry out operations, as described below. Processor 118 may be a standard off-the-shelf System-on-Chip (SoC) device, System-in-Package (SiP) device, or general purpose processing unit with software or firmware (e.g. specialized software such as may embody the above-noted applications) that, when executed, performs the steps and operations described herein. Alternatively, processor 118 may be an Application-Specific Integrated Circuit (ASIC) that performs the steps and operations described herein using hardware (e.g. implementing the above-noted applications). Communication interface 120 provides for communication between storage system 110 and elements external thereto, such as transient storage device 100, host 104 and a network (not shown). Such communication may be wired or wireless and may occur via intermediaries not mentioned herein. User interface 122 provides for user interaction with storage system 110. User interface 122 may include a graphical user interface (GUI), command line interface, and/or other interfaces suitable for the purposes described herein. Secondary data store 114 is used to back up (keep copies of) the data stored in primary data store 102. Deleted data store 116 is used to back up (keep copies of) data that has been deleted from primary data store 102. Secondary data store 114 and deleted data store 116 may each be a non-volatile memory suitable for backup storage, including remote and online storage, such as web-based storage, corporate storage area networks, home storage servers, or other suitable types of storage/memory.

Systems and components described herein may be software, firmware, hardware or any combination thereof suitable for the purposes described herein. Systems and components described herein may reside on servers, host computers, and other devices suitable for the purposes described herein. As will be understood by one of ordinary skill in the art, in some cases, components may be divided or integrated into a larger or smaller number of components than described. "Data" as referred to herein may be computer files of any type (e.g. text, pictures, audio, video, binary, etc.) and any other data formats or structures suitable for the purposes described herein.

Figure 1B:
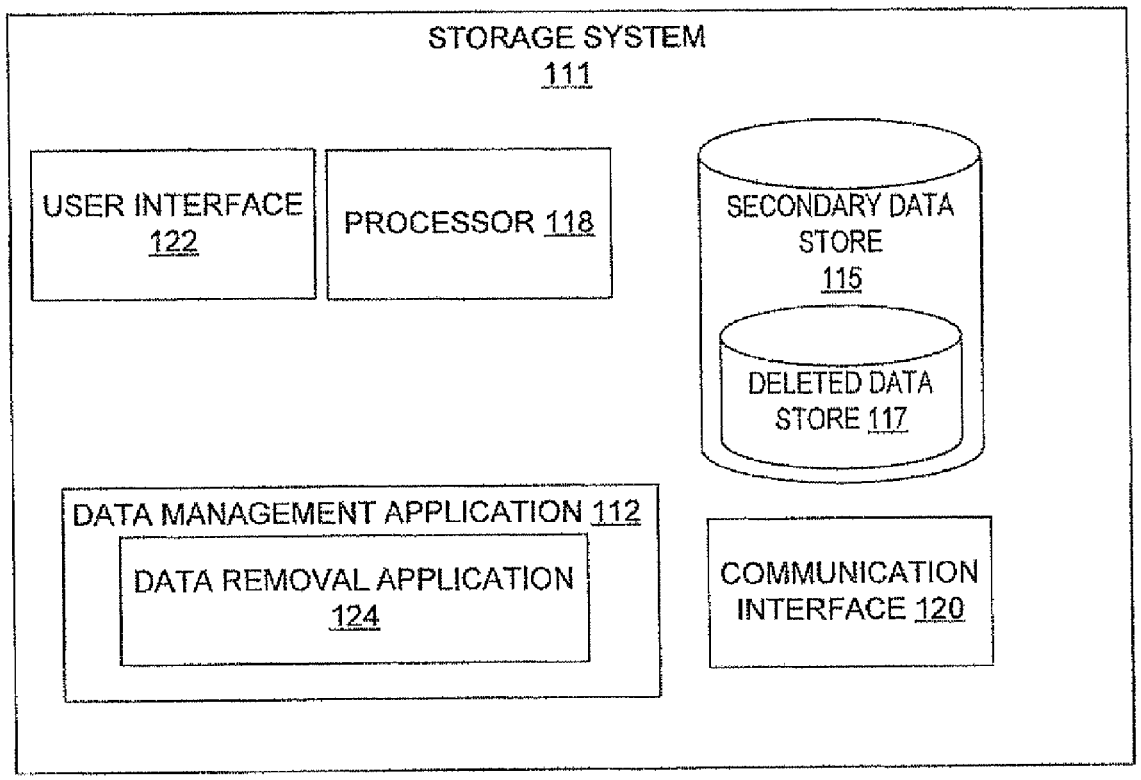

In some embodiments, deleted data store 116 is an element separate from secondary data store 114 ("separate" or "separated" deleted data storage), as shown in FIG. 1A, while in other embodiments deleted data store 117 is implemented within secondary data store 115 ("integrated," "combined," or "shared" deleted data storage), as illustrated schematically in storage system 111 shown in FIG. 1B. This distinction will be elaborated below. For the sake of convenience, FIG. 1B illustrates only a part of FIG. 1A. It is understood that transient storage device 100, primary data store 102, host 104, host operating system 105, data transfer operations 106, data deletion operations 107 and data and notifications transfer operations 108 shown in FIG. 1A apply also to FIG. 1B.

Other arrangements of storage systems 110 and 111 shown in FIGS. 1A and 1B, respectively, and the other elements in conjunction with which storage systems 110 and 111 may operate (such as primary data store 102, host 104, network (not shown), etc.) may be employed, as will be understood by one of ordinary skill in the art in view of the description given herein. In that regard, for example, storage system 110, 111 may, but need not, reside on a host 104 or a network. (The usage "storage system 110, 111" refers to storage system 110 or 111 or both, as appropriate in view of the context. Similar usages are to be interpreted in similar fashion.) Moreover, the various components of storage system 110, 111, such as processor 118, data management application 112, secondary data store 114, 115 and deleted data store 116, 117, need not be located together (e.g. in the same device or server), as shown in FIGS. 1A and 1B, but any of the components may reside remotely from any other, unless indicated otherwise herein (e.g. in the case of shared deleted storage, where deleted data store 117 is implemented within secondary data store 115, these two components would reside together, although deleted data store 117 could reside remotely from a portion of secondary data store 115 where secondary data store 115 is distributed among multiple devices). Individual components of data management application 112 may also reside remotely from one another. Any components of storage system 110, 111 may but need not reside on a host 104 or a network (not shown). Communication among components of storage system 110, 111 and other elements (e.g. primary data store 102, host 104, etc.) in conjunction with which storage system 110, 111 operates may but need not occur via a network. Multiple hosts 104 may also be used in conjunction with storage system 110, 111. A single host 104 may be connected to multiple storage systems 110, 1111. Storage system 110, 111 may be a component of one or more hosts 104 to which transient storage device 100 is connected. Storage system 110, 111 may serve multiple clients each having one or more primary data stores 102. Storage system 110, 111 may include components other than or additional to those described herein and may perform functions other than or additional to those described herein.

Insofar as details of components of storage system 110, 111 disclosed herein, or of operations of such components, are, for the sake of convenience, omitted, it is understood that such details are known to one of ordinary skill in the art.

A brief and simplified overview of the operation of storage system 110, 111 according to embodiments of the present disclosure is as follows. The operations described below may be performed by data management application 112. When data is added (e.g. 106) to primary data store 102, a notification may be sent (e.g. 108) to storage system 110, 111, in response to which data management application 112 copies that added data to secondary data store 114, 115 to create a backup, in storage system 110, 111, of the data stored in primary data store 102. This backup is illustrated, e.g., as mirror 260 or 360 in FIGS. 2A and 3A, respectively. When data is deleted (e.g. 107) from primary data store 102 a notification is sent (e.g. 108) to storage system 110, 111, in response to which data management application 112 transfers that deleted data (i.e. the copy of that deleted data that was previously copied from primary data store 102 to mirror 260, 360 of secondary data store 114, 115 when that data was added to primary data store 102) from mirror 260, 360 of secondary data store 114, 115 to deleted data store 116, 117, or equivalently, data management application 112 deletes that deleted data from mirror 260, 360 and copies (writes) that deleted data to deleted data store 116, 117. This transfer operation serves both to maintain consistency between (identity of) the contents (data 269, FIG. 2A) of primary data store 102 and the contents of mirror 260, 360 of secondary data store 114, 115, and to retain at least some of the data deleted from primary data store 102 in deleted data store 116, 117, thereby providing a backup of data deleted from primary data store 102.

As a qualification, or complication, to the above, it should be noted that it may occur that primary data store 102 is not operationally connected to storage system 110, 111 when changes (e.g. additions and deletions) to the data stored in primary data store 102 are made. This may occur because the device containing primary data store 102 is physically disconnected from (e.g. the host or the server on which) storage system 110, 111 (resides). In such a situation, additions and deletions of data from primary data store 102 cannot be notified to storage system 110, 111, so that the subsequent operations of addition/deletion of data to mirror 260, 360/deleted data store 116, 117 (as appropriate) cannot be performed. It may be arranged that, in this case, the notifications are made upon subsequent (e.g. next) operational connection of primary data store 102 to storage system 110, 11, and the above-noted subsequent operations of storage system 110, 111 are performed automatically, thereby synchronizing/updating mirror 260, 360/deleted data store 116, 117 with primary data store 102.

In the above scenario, there is thus a delay between the time at which data is added to or deleted from primary data store 102 and the time at which the corresponding changes are made to secondary data store 114, 115 and deleted data store 116, 117. Such a delay may also caused by other factors, e.g. inherent delays in operation of storage system 110, 111 or any components thereof, or suspension (temporary or permanent) of all or part of the backup functionality at the user's request. Due to such a delay, it may occur that, at a given point in time, the backups contained in mirror 260, 360 and deleted data store 116, 117 are not up to date and do not "match" the current state of affairs in primary data store 102.

Data management application 112, and in particular data removal application 124 thereof, removes (e.g. 255, 355, FIGS. 2B, 3C) data from deleted data store 116, 117 as required by the size (storage capacity) limit of deleted data store 116, 117, and (in embodiments in which the deleted data store (i.e. 117) is implemented within the secondary data store (i.e. 115)) as required to accommodate data copied to secondary data store 115 as a backup of data added to primary data store 102. The removal (e.g. 255, 355) of data from deleted data store 116, 117 may be performed automatically by storage system 110, 111, according to a criterion; i.e. data satisfying a criterion is deleted. The criterion may be set by the storage system. Alternatively, the criterion may be set by a user. The removal (e.g. 255, 355) of data from deleted data store 116, 117 may also be performed manually, e.g. on an ad-hoc basis, by a user. The criterion may be complex, e.g., involving a combination of criteria. It should be noted that, unlike the deletion of data from mirror 260, 360 of secondary data store 114, 115, which (as described in the previous paragraph) is accompanied by writing or copying of the deleted data into deleted data store 116, 117, and hence does not constitute a permanent (unrecoverable) deletion or loss of the data, the removal (e.g. 255, 355) of data from deleted data store 116, 117 is not accompanied by any writing or copying of the deleted data elsewhere, and hence does constitute a permanent (unrecoverable) deletion or loss of the data.

The following discussion will describe specific example embodiments of storage system 110, 111, including further details of the above-described operations as well as additional aspects of storage system 110, 111.

Figure 2A:
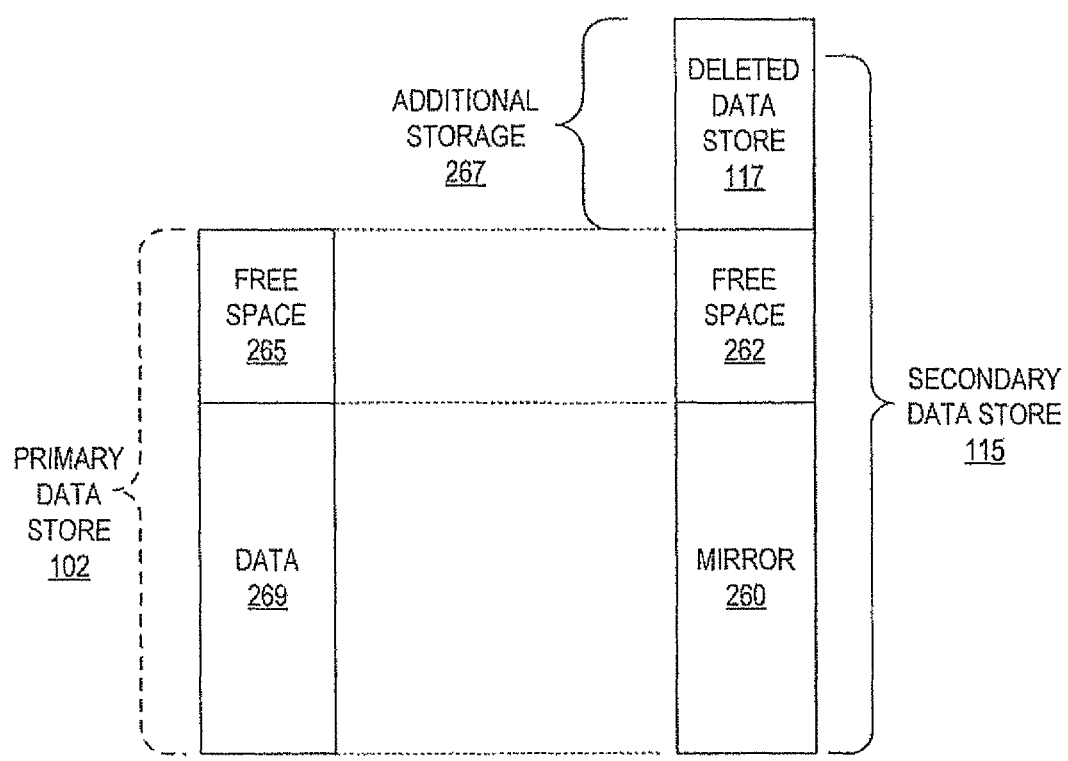
FIGS. 2A-2C illustrate a secondary data store of a storage system, together with a primary data store in conjunction with which a storage system may operate, according to example embodiments in which a deleted data store is implemented within the secondary data store.
Figure 2B:
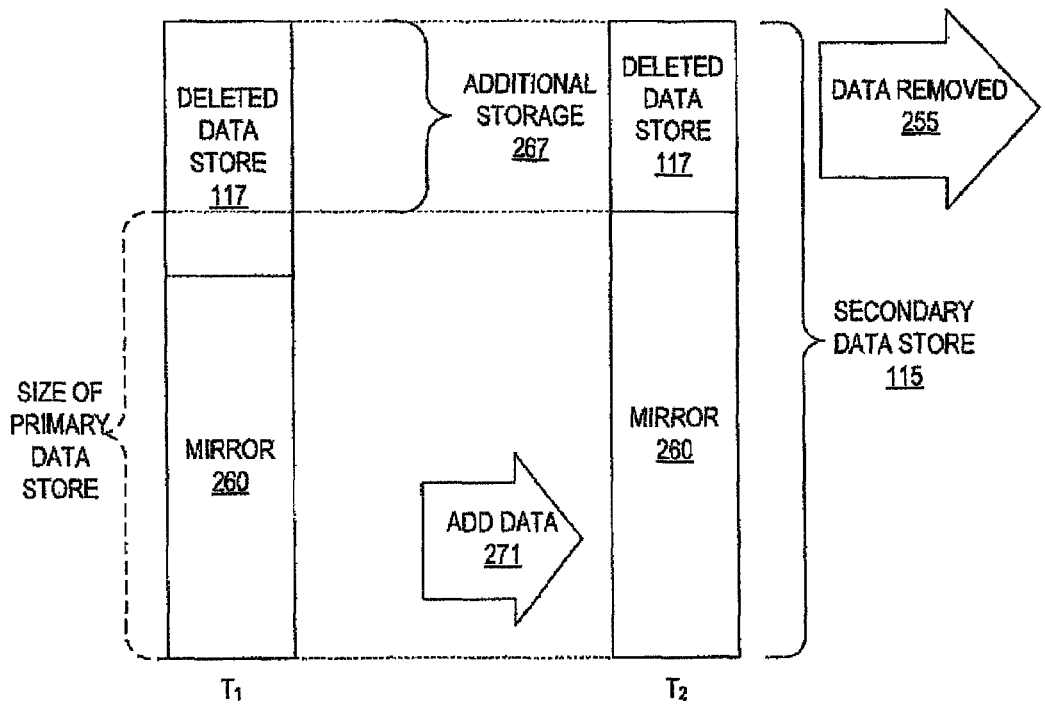
Figure 2C:
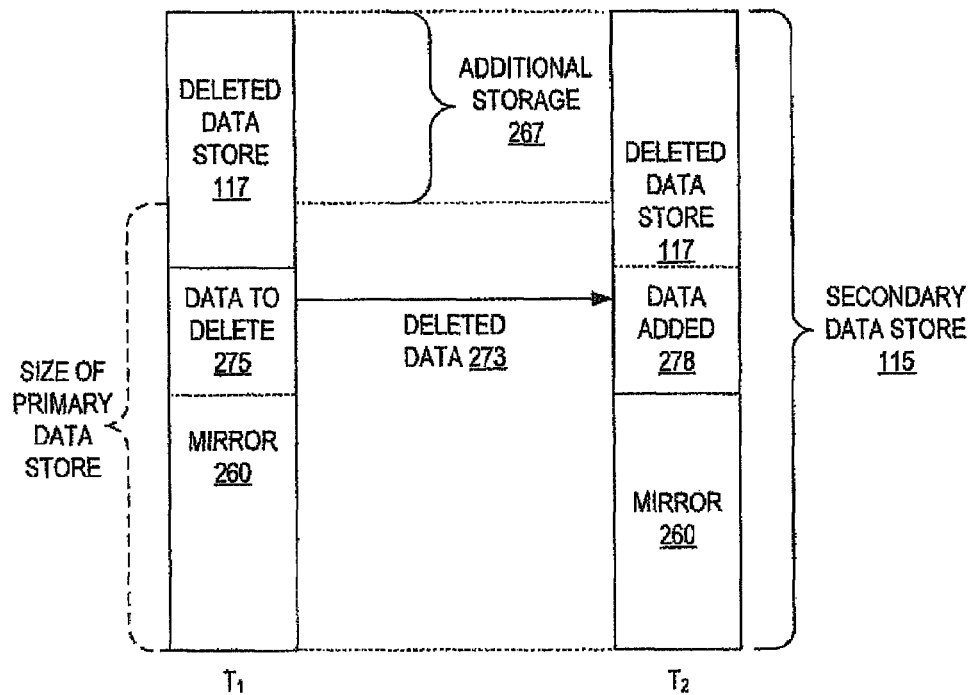

FIGS. 2A-2C illustrate an example embodiment of storage system 111 characterized by "integrated" (or "combined" or "shared") deleted data storage, i.e. where deleted data store 117 is implemented within secondary data store 115 (as shown in FIG. 1B). For the sake of convenience, FIGS. 2A-2C omit components of storage system 111 other than secondary data store 115 and deleted data store 117. It will be noted that FIG. 2A shows not only secondary data store 115 and deleted data store 117 but also primary data store 102.

A general discussion of the storage system 111 of this embodiment will now be given with limited attention to FIGS. 2A-2C. In storage system 111 characterized by integrated deleted data storage, secondary data store 115 includes both mirror 260 and deleted data store 117 (and potentially free space 262), and the size of secondary data store 115 is greater than that of associated primary data store 102 being backed up by secondary data store 115. (As will be understood from the description herein, the condition that the size of secondary data store 115 be greater than that of primary data store 102 permits—and is required for—data deleted from primary data store 102 to be retained (in deleted data store 117) even when primary data store 102 is filled to capacity, i.e. contains no free space 265.) Secondary data store 115 need not be physically divided to contain two such separate portions, but rather the space (storage capacity) within secondary data store 115 may be variably allocated between mirror 260, deleted data store 117, and free space 262, which may be considered as belonging to neither mirror 260 nor deleted data store 117.

The variable allocation of space within secondary data store 115 is subject to the following limitations on the size of mirror 260 and the size of deleted data store 117. Mirror 260 is designed to hold copies of all data stored in primary data store 102. Hence the size (storage capacity) of mirror 260 at any point in time equals that of the contents (data 269) of primary data store 102, and the size of mirror 260 may not exceed the full capacity of primary data store 102. The following caveat applies to the previous sentence. There may be a delay between the time at which data is added to or deleted from primary data store 102 and the time at which the same change is made to secondary data store 115, due to, for example, primary data store 102 being not operationally connected to storage system 111, delays in operation of storage system 111, or suspension of all or part of the backup functionality at the user's request, as explained above. Due to such a delay, it may occur that, at a given point in time, the size of mirror 260 does not equal that of the contents (data 269) of primary data store 102.

As for deleted data store 117, the size thereof may expand to occupy all of the space not occupied by mirror 260. At the other extreme, when mirror 260 is at its largest size (equaling the full capacity of primary data store 102), deleted data store 117 is reduced to the size of additional storage 267 (as is the case in FIG. 2A). Thus, the size of additional storage 267 may be understood to be the minimum size of deleted data store 117, as follows. Even if deleted data store 117 is empty, additional storage 267 may be deemed to be reserved for deleted data store 117. Additional storage 267 need not be physically (e.g. fixedly) assigned to deleted data store 117, but in practice additional storage 267 is at least effectively reserved for deleted data store 117. The reason for this is that mirror 260 has no need or use for additional storage 267, since the maximum storage capacity mirror 260 requires is the full capacity of primary data store 102, and additional storage 267 is defined as the excess space in secondary data store 115 over and above the full capacity of primary data store 102.

Within the terms of the above framework, any given space within secondary data store 115 is allocated to (or rendered a part of) mirror 260 or deleted data store 117, respectively, merely by virtue of that space's holding data assigned to mirror 260 or deleted data store 117, respectively. Thus, all data in secondary data store 115 is assigned to either mirror 260 or deleted data store 117. Such assignment may be carried out by marking data assigned to mirror 260 differently from data assigned to deleted data store 117, by marking one of the two types of data and not the other (the unmarked data may be deemed effectively marked), or by any other manipulation of metadata of the data, or any other suitable way, as will be appreciated by one of ordinary skill in the art in view of the description provided herein.

While all the data in secondary data store 115 is assigned to either mirror 260 or deleted data store 117, not all the space in secondary data store 115 is necessarily assigned to either mirror 260 or deleted data store 117. Space not occupied by data assigned to mirror 260 or data assigned to deleted data store 117 is free space 262 (subject to the above-noted point (caveat) that deleted data store 117 may be deemed to have unoccupied space, when the contents of deleted data store 117 do not fill additional storage 267). Space released (rendered unoccupied) by deletion 273 of data from mirror 260 or removal 255 of data from deleted data store 117 returns to the status of free space 262 (again subject to the above-noted point (caveat) that deleted data store 117 may be deemed to have unoccupied space, when the contents of deleted data store 117 do not fill additional storage 267).

While the present disclosure may refer to the "sizes" of mirror 260 and deleted data store 117 and of "changes" in those sizes, and the like, such locutions should be understood in terms of the above discussion.

We now continue the discussion with more detailed attention to and description of FIGS. 2A-2C. The allocation and management of data in secondary data store 115 in this example embodiment will now be discussed, with reference to primary data store 102.

As shown in FIG. 2A, primary data store 102 contains data 269 and, unless primary data store 102 is full, free space 265, i.e. the unoccupied portion of primary data store 102 that is free to hold data to be added to primary data store 102. If data 269 were to fill primary data store 102 to capacity, there would be no free space 265 in primary data store 102.

Secondary data store 115 includes, as stated, mirror 260, deleted data store 117 and, potentially, free space 262. That is, if either mirror 260 or deleted data store 117 is not filled to capacity, then secondary data store 115 also includes free space 262. Mirror 260 is designed to mirror, i.e. holds copies of, exactly all of data 269 stored in primary data store 102. Thus, as data is added to primary data store 102, the same data is also written (271, FIG. 2B) to mirror 260 of secondary data store 115, and when data is deleted from primary data store 102, the identical data in mirror 260 is deleted (273, FIG. 2C) from mirror 260. (With regard to the backing up of data, e.g. in secondary data store 115 or in deleted data store 117, this disclosure will speak interchangeably of storing or writing copies of original data in/to a second location, copying original data to a second location, storing or writing the original data in/to a second location, storing or writing data identical (or corresponding) to the original data in/to a second location, and the like.) Regarding the deletion of data, it is noted that this deletion may be either physical deletion or virtual (logical) deletion, the latter being accomplished e.g. by marking the data as deleted. Further, as stated above and as will be elaborated further below, the data deleted 273 from mirror 260 is not removed from secondary data store 115 altogether, but rather is copied to deleted data store 117.

Note that while mirror 260 stores copies of all the data 269 stored in primary data store 102, there is no need to mirror free space 265 of primary data store 102. Accordingly, as shown in FIG. 2A and as discussed below, the portion of secondary data store 115 corresponding to free space 265 of primary data store 102 is also free space 262 in secondary data store 115, available for use by either mirror 260 or deleted data store 117.

Deleted data store 117 is designed to hold copies of (at least some of the) data deleted from primary data store 102. Of course, deleted data store 117 can be emptied of its contents, e.g. by user action, and thus may at any given time be empty.

Since the amount of data 269 in primary data store 102 may change, the size of mirror 260 of secondary data store 115 may change correspondingly and the size of free space 265 of primary data store 102 may change inversely. Therefore, the size of deleted data store 117 may change, even if the size of additional storage 267 and the size of secondary data store 115 are fixed. (As explained below in the discussion of FIGS. 4A and 4B, the size of additional storage 267 and the size of secondary data store 115 are initially fixed, but may be changed, e.g. by user action.) Notably, so long as the size of secondary data store 115 and the size of additional storage 267 remain the same, the size of deleted data store 117 and the size of mirror 260 are variable in inverse relation to one another. Thus, when the amount of free space 265 available in primary data store 102 decreases, the amount of free space 262 in secondary data store 115 decreases, the size of mirror 260 increases, and the amount of space available to deleted data store 117 in secondary data store 115 decreases, all by the same amount.

As noted above and as seen in FIG. 2A, in this embodiment secondary data store 115 is larger than primary data store 102. This permits—and is required for—retention (in deleted data store 117) of data deleted from primary data store 102 even when primary data store 102 is filled to capacity, i.e. contains no free space 265. For, as noted, when primary data store 102 is filled to capacity, i.e. contains no free space 265, the size (i.e. storage capacity) of deleted data store 117 is reduced to the size of additional storage 267, as may be deduced from FIG. 2A. As noted and as is now also clear from FIG. 2A, the size of additional storage 267 equals the extent by which the storage capacity of secondary data store 115 exceeds that of primary data store 102, or in other words, equals the difference in size between secondary data store 115 and primary data store 102. As is further clear from this discussion and from FIG. 2A, if the size of secondary data store 115 were to equal the size of primary data store 102, then if primary data store 102 were full secondary data store 115 would also be full (with copies of the data 269 stored in primary data store 102) and would have no extra space, i.e. no space to retain data deleted from primary data store 102.

FIGS. 2B and 2C illustrate the changing allocation of storage space within secondary data store 115, as between mirror 260 and deleted data store 117 as data is added 271 to (FIG. 2B) or deleted 273 from (FIG. 2C) mirror 260 of secondary data store 115. This addition 271/deletion 273 of data to/from mirror 260 of secondary data store 115 occurs, as stated, upon adding/deleting data to/from primary data store 102. The left side of both figures illustrates the storage at time T1, i.e., before the data addition 271 or deletion 273 operation, and the right side of both figures illustrates the storage at time T2, i.e., after the data addition 271 or deletion 273 operation. (It should be noted, however, that the arrow labeled "Data Removed 255" is not to be taken as indicating that this data removal operation occurs after the state shown in T2; rather, as explained below, this data removal operation occurs prior to the state shown in T2 and, specifically, prior to the addition 271 of data. It is also noted that the illustrated arrow labeled "Add Data 271" does not represent the moving of data from the left structure to the right structure.) In both FIGS. 2B and 2C, the size of primary data store 102 (shown by the dashed bracket) is equal to the size of secondary data store 115 minus the size of additional storage 267, as was the case in FIG. 2A.

As shown in the example scenario of FIG. 2B, at time T1 (on the left side), i.e., before the addition 271 of data to secondary data store 115, the size of mirror 260 is less than the size of primary data store 102, and the size of deleted data store 117 is correspondingly larger than the size of additional storage 267. (Thus, it should be noted that in this figure, already from time T1, deleted data store 117 (as well as mirror 260, hence secondary data store 115 as a whole) is full, in contrast to FIG. 2A, in which free space 262 exists in secondary data store 115.) As data is added to primary data store 102 (addition operation not shown), identical data is added 271 to mirror 260, whereby the size of mirror 260 grows toward its maximum size, namely, the size of primary data store 102, and the size of deleted data store 117 decreases correspondingly toward its minimum size, namely, the size of additional storage 267, which changes are shown at time T2 (on the right side). It is noted, however, that the addition 271 of data to mirror 260 required the removal 255 of data (i.e. data previously deleted from primary data store 100) from deleted data store 117, in order to free up space in secondary data store 115 to accommodate the data (copies of the data newly added to primary data store 102) added 271 to mirror 260. Note that, in contrast, in the situation of secondary data store 115 shown in FIG. 2A, the addition of (a certain amount of) data to mirror 260 of secondary data store 115 would not have required removal of data from deleted data store 117, because there exists free space 262 in secondary data store 115 to accommodate (a certain amount of) new data.

The removal 255 of data from deleted data store 115 may be performed automatically by data removal application 124 of data management application 112 (shown in FIG. 1A). Data removal application 124 selects data contained in deleted data store 117 for removal based on criteria (or equivalently, priorities). Examples of criteria that may be employed include the duration of time that has elapsed since a given operation was last performed on data (the phraseology "operations performed on data" or the like being used in this context to refer to at least any of the following: creation of data, accessing of data, using data, modification of data, deletion of data (e.g. deletion from primary data store 102 or transfer to deleted data store 117), the size of the (file in which) data (is contained), the type of (file in which) data (is contained), the original location of (a file in which) data (is contained), the location in the file system of the file in which data is contained when the file was deleted, the content of metadata of (a file in which) data (is contained), the frequency with which the data has been accessed, other characteristics of the data believed to be correlated with user preferences or with the likelihood of use of the data by a user, etc. To further specify the above examples, removal 255 of data based on duration of time that has elapsed since a certain event occurred means removing 255 data if the duration of time that has elapsed since the certain event occurred exceeds a certain threshold (value), in this case a threshold duration of time. Again, removal 255 of data based on the type of (file in which) data (is contained) means removing 255 data if the type of (file in which) data (is contained) is a certain specified type or one of a set of certain specified types of (files in which) data (is contained). The other examples set forth above would be may be explained in the same or similar manner.

In addition, criteria on which removal 255 of data from the deleted data store 117 is based may also be selected or determined by a user. Such criteria may be criteria mentioned above or other criteria (or equivalently, priorities). For example, a user may determine a prioritization of data to be removed, e.g. a list of prioritization rules such as: first, remove 255 all files whose frequency of use falls below a certain threshold (i.e. minimum); second, remove 255 all files whose size exceeds a certain threshold.

To be sure, such a prioritized list may also be employed automatically by data removal application 124. In addition, multiple criteria may also be employed in other ways, e.g. using a weighted average, using a sum or product of values generated from individual criteria, or in other ways. The locution that "criteria may include one or more of a specified list of criteria," or the like, is not to be taken as placing any limitations as to how multiple criteria may be combined or jointly applied.

The criteria may but need not be preset by storage system 111 (e.g., prior to initial use by the end user), in which case they may but need not be made subject to modification by the end user. The criteria are applied repeatedly to select data for removal until sufficient storage space in deleted data store 117 is recovered to be made available to mirror 260 to accommodate copies of the data newly added to primary data store 102. The selection of data (e.g. files) based on the criteria may be made, e.g., by scanning the data in deleted data store 117 and analyzing the scanned data with respect to any metadata thereof, e.g. comparing metadata indicative of a certain characteristic (e.g. file size) with a threshold value (e.g. a specified maximum file size). Multiple criteria may be applied individually to select data for removal 255 or applied concurrently and a composite value used to select data for removal 255. It is understood that further details of the above-described automatic removal 255 of data based on criteria (including the setting of the criteria) and variations thereon are known to those of ordinary skill in the art. Of course, the removal 255 of data from deleted data store 117 may also be performed manually (e.g. in a non-systematic way) by a user. For example, when data removal 255 is required, the user could be prompted to remove data.

FIG. 2C illustrates the states of affairs when data is deleted 273 from mirror 260, at the same two points in time as were illustrated in FIG. 2B. The left side of the figure shows secondary data store 115 at time T1, i.e. prior to deletion 273 of data from mirror 260 of secondary data store 115. (Note that, as in FIG. 2B, mirror 260 and deleted data store 117 are full in FIG. 2C, as evidenced by the absence of free space 262 in secondary data store 115.) When data is deleted from primary data store 102 (data deletion not shown), the identical data is transferred from mirror 260 to deleted data store 117 (or equivalently, the identical data is deleted 273 from mirror 260 and copied or written to deleted data store 117). The deletion 273 of the data (residing in space 275, "data to delete") from mirror 260 frees up space (space 278, "data added"), which is made available to (and taken over by) deleted data store 117, to accommodate the deleted data. Accordingly, the size of mirror 260 decreases and the size of deleted data store 117 increases correspondingly, as shown by the exchange of places of the solid and dashed horizontal lines in secondary data store 117 that occurs as we move from T1 to T2; the space 275 (storage capacity) in mirror 260 occupied at time T1 (on the left side) by the data to be deleted ("data to delete") is effectively transferred or released from mirror 260 and made available to and taken over by deleted data store 117 (as space 278, "data added"), which outcome is shown at time T2 (on the right side). Unlike the case of adding 271 data to mirror 260 (shown in FIG. 2B), in the case of deleting 273 data from mirror 260; it is not necessary to remove 255 data from deleted data store 117 (or from secondary data store 115), because there is no net addition of data to secondary data store 117; the data being added to deleted data store 117 has been subtracted from mirror 260; the sum of the size of mirror 260 and the size of deleted data store 117 remains the same.

Figure 3A:
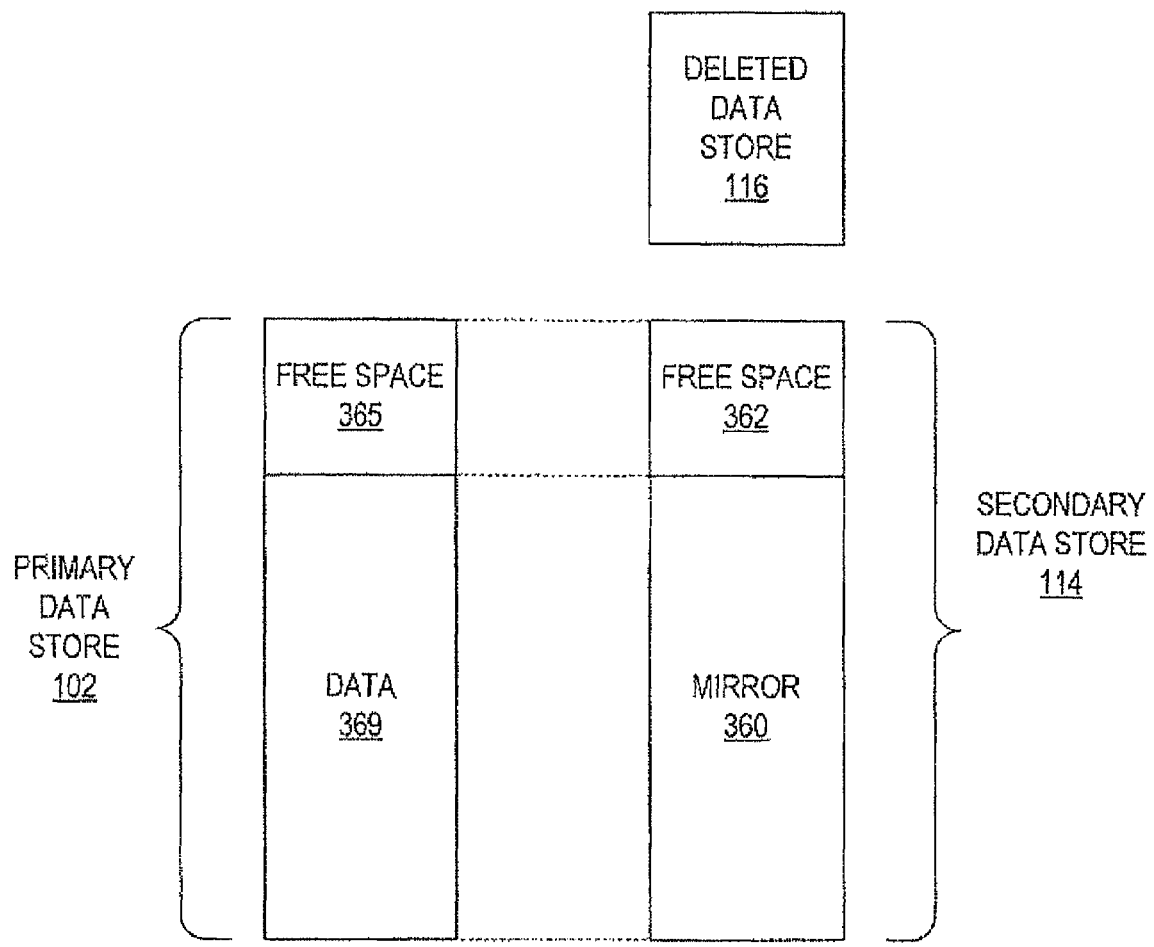
FIGS. 3A-3C illustrate a secondary data store and a deleted data store of a storage system, together with a primary data store in conjunction with which a storage system may operate, according to alternative example embodiments in which the deleted data store is implemented outside the secondary data store.

A caveat is in order here. As noted, if primary data store 102 is for some reason not connected to storage system 111, it could occur that data is added to primary data store 102 without copies thereof being added to mirror 260 of secondary data store 115. If such added data is then deleted from primary data store 102 while primary data store 102 has still not been connected to storage system 111, upon such subsequent connection, storage system 111 will attempt to write the data (which was first added to primary data store 102, then deleted therefrom) to deleted data store 117. In this case, however, in contrast to the case illustrated in FIG. 2C, the data in question is not contained in mirror 260 and hence is not deleted from mirror 260, so mirror 260 does not release space to be made available to deleted data store 117 to accommodate therein the data in question. Hence, it could be necessary to remove 255 data from deleted data store 117 in order to accommodate therein the data in question. Thus, in this special case, the deletion of data from primary data store 102 can require removal 255 of data from deleted data store 117. (In this case of removal 255 of data from deleted data store 117, it would be possible to apply the criterion (used for selecting data to be removed) also to the newly deleted data (i.e. which was not backed up in mirror 260). As an alternative, it would also be possible to simply not write the newly deleted data into deleted data store 117. This alternative would have the same outcome as if the newly deleted data were written to deleted data store 117 and then removed therefrom (but in the posited circumstances this sequence of events cannot occur as deleted data store 117 does not have adequate space to accommodate the newly deleted data without first having some of its contents removed).) In contrast to the embodiment featuring integrated deleted data storage illustrated in FIGS. 2A-2C, FIGS. 3A-3C illustrates an example embodiment of storage system 110 characterized by "separate" (or "separated") deleted data storage, i.e. where deleted data store 116 is separate from secondary data store 114 (as shown in FIG. 1A). For the sake of convenience, FIGS. 3A-3C omit components of storage system 110 other than secondary data store 114 and deleted data store 116. It will be noted that FIG. 3A shows not only secondary data store 114 and deleted data store 116 but also primary data store 102. The allocation and management of data in secondary data store 114 and deleted data store 116 in this example embodiment will now be discussed, with reference to primary data store 102.

As shown in FIG. 3A, if the data 369 of associated primary data store 102 occupies less than the maximum capacity thereof, a free space 365 remains in primary data store 102, and an equivalent free space 362 of equal size exists in secondary data store 114. Unlike the case of integrated deleted data storage (FIGS. 2A-2C), here free space 362 of secondary data store 114 is not available to become part of deleted data store 116. Rather, the size of deleted data store 116 is initially fixed (though subject to change, as discussed below), and is not influenced by changes in the size of mirror 360. As discussed below, again in contrast to the case of integrated deleted data storage, with the use of separate deleted data store 116 it is the deletion of data from primary data store 102 rather than the addition of data to primary data store 102 that can require removal 355 of data stored in deleted data store 116. (As noted above in the discussion of FIG. 2C, in the case of integrated deleted data storage there is a special case ("caveat") in which the deletion of data from primary data store 102 can require removal 255 of data stored in deleted data store 117.)

Figure 3B:
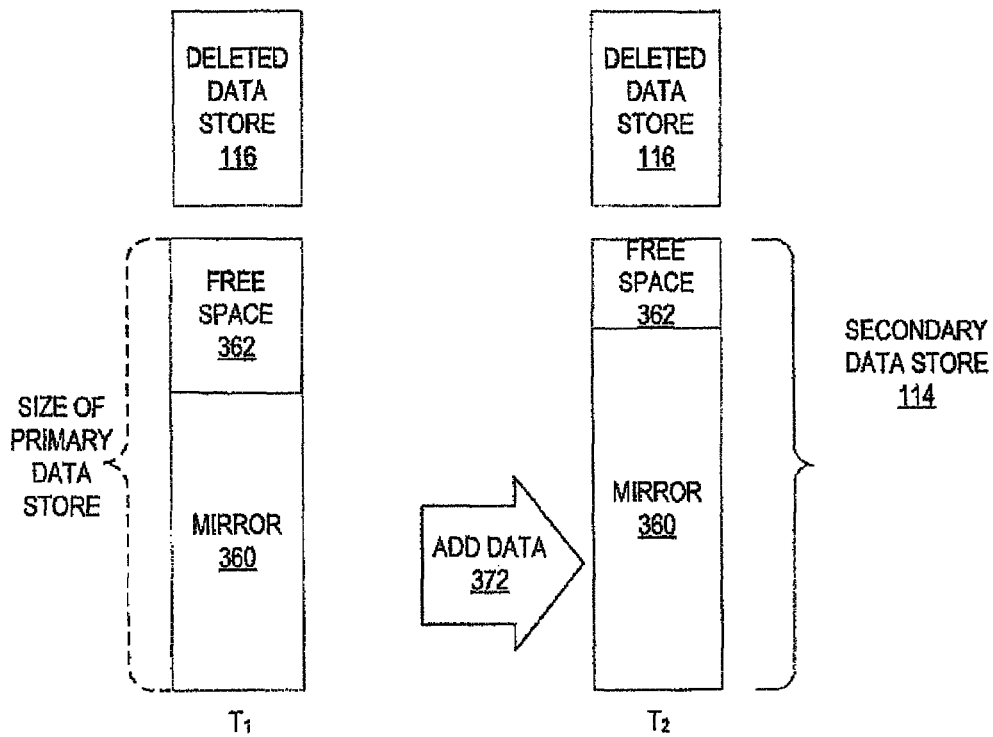
Figure 3C:
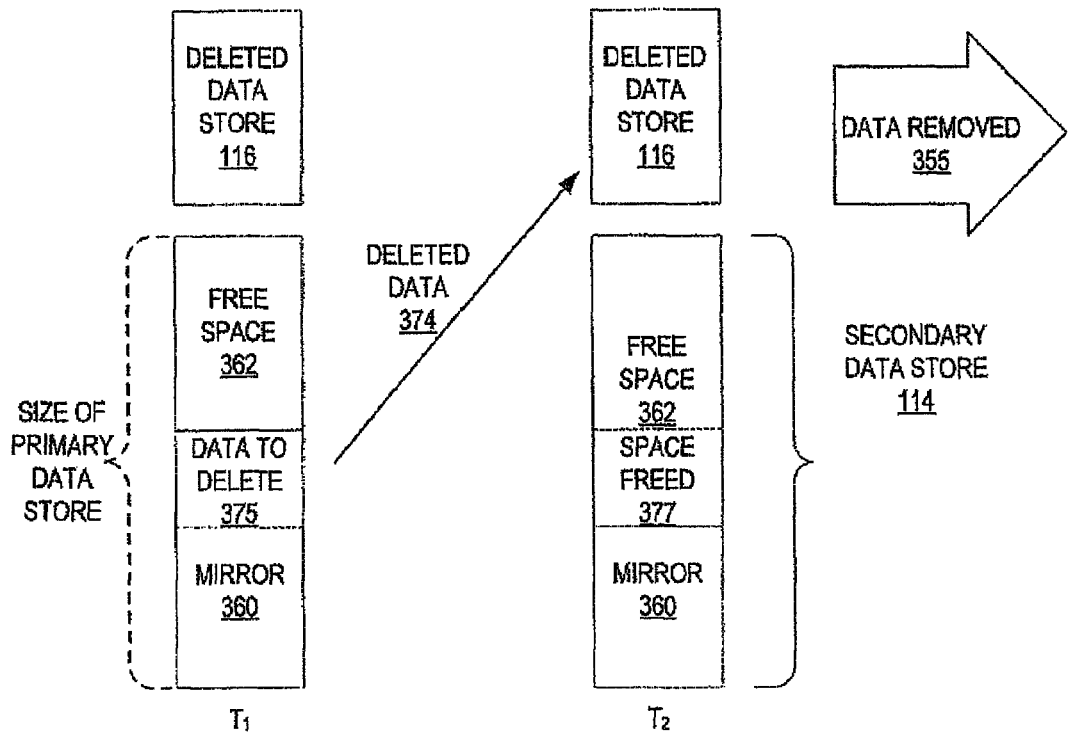

FIGS. 3B and 3C illustrate the changing allocation of storage space as between mirror 360 and free space 362 of secondary data store 114 as data is added 372 to (FIG. 3B) or deleted 374 from (FIG. 3C) mirror 360 of secondary data store 114. This addition 372/deletion 374 of data to/from mirror 360 of secondary data store 114 occurs, as stated, upon adding/deleting data to/from primary data store 102. The left side of both figures illustrates the storage at time T1, i.e. before the data addition 372 or deletion 374 operation, and the right side of both figures illustrates the storage at time T2, i.e. after the data addition 372 or deletion 374 operation. (It should be noted, however, that the arrow labeled "Data Removed 355" is not to be taken as indicating that this data removal operation occurs after the state shown in T2; rather, as explained below, this data removal operation occurs prior to the state shown in T2 and, specifically, prior to the deletion 374 of data. It is also noted that the illustrated arrow labeled "Add Data 372" does not represent the moving of data from the left structure to the right structure.) In both figures, the size of primary data store 102 (shown by the dashed bracket) is equal to the size of the secondary data store 114, as was the case in FIG. 3A. (It is noted that FIGS. 3B and 3C are not necessarily drawn exactly to the same scale as FIG. 3A. It may be assumed that the size of primary data store 102, the size of secondary data store 114, and the size of deleted data store 116 in FIGS. 3B and 3C are the same as the size of primary data store 102, the size of secondary data store 114, and the size of deleted data store 116, respectively, in FIG. 3A.)

As shown in the example scenario of FIG. 3B, at time T1 (on the left side), i.e. before the addition 372 of new data to secondary data store 114, the size of mirror 360 is less than the size of primary data store 102, and size of deleted data store 116 is initially fixed and is independent of the size of secondary data store 114. Because the size of mirror 360 is less than the size of primary data store 102 (i.e. primary data store 102 is not full to capacity with data 369), there exists some free space 362 in secondary data store 114. If instead the size of mirror 360 were the same as the size of primary data store 102 (i.e. if primary data store 102 were full to capacity with data 369), there would be no free space 362 in secondary data store 114 and the addition of data to secondary data store 114 would not be possible. As data is added to primary data store 102 (addition operation not shown), identical data is added 372 to secondary data store 114, whereby the size of mirror 360 increases and the size of free space 362 decreases correspondingly, which changes are shown at time T2 (on the right side). The size of deleted data store 116 and its contents do not change from T1 to T2, as deleted data store 116 is separate from and independent of secondary data store 114.

FIG. 3C illustrates data deletion 374 from mirror 360, showing the situation of the secondary data store 114 at the same two points in time as were illustrated in FIG. 3B. At time T1 (on the left side), i.e. before the data deletion 374, secondary data store 114 still has a finite amount of free space 362 (although if primary data store 102 were full, secondary data store 114 would not have any free space 362). When data is deleted from primary data store 102 (deletion operation not shown), identical data from mirror 360 is moved to deleted data store 116, and the size of mirror 360 decreases while the size of free space 362 increases correspondingly, as shown by the exchange of places of the solid and dashed horizontal lines in secondary data store 114 that occurs as we move from T1 to T2: the space 375 (storage capacity) in mirror 360 occupied at time T1 (on the left side) by the data to be deleted ("data to delete") is effectively transferred or released from mirror 360 to become free space 377 ("space freed"), which outcome is shown at time T2 (on the right side). Because the size of deleted data store 116 is fixed (subject to the caveat discussed below) and the released space does not become available to it, old data in deleted data store 116 may need to be removed 355 to make space for newly deleted data. In any event, a limiting point will eventually be reached at which old data in deleted data store 116 will need to be removed 355 to make space for newly deleted data. In such a case, when there is not adequate space in deleted data store 116 to accommodate both the existing contents of deleted data store 116 (i.e. data previously deleted from primary data store 102) and the newly deleted data, removal 355 of data from deleted data store 116 is carried out in accordance with a criterion, as was explained above with reference to FIG. 2B. In that regard, as explained above with respect to the special case (caveat) mentioned in the discussion of FIG. 2C, it would also be possible to apply the criterion also to the newly deleted data. As an alternative, it would also be possible to simply not write the newly deleted data into deleted data store 116. This alternative would have the same outcome as if the newly deleted data were written to deleted data store 116 and then removed 355 therefrom (but in the posited circumstances this sequence of events cannot occur as deleted data store 116 does not have adequate space to accommodate the newly deleted data without first having some of its contents removed 355).

In the above or other example embodiments, it is also possible to adjust the size of secondary data store 115 (in the case of the shared deleted data storage embodiment shown in FIGS. 2A-2C) or of deleted data store 116 (in the case of the separated deleted data storage embodiment shown in FIGS. 3A-3C). Of course, if the size of primary data store 102 is adjusted, it would be desirable to adjust the size of mirror 260, 360 of secondary data store 114, 115 accordingly. However, in the following discussion, it is assumed that the size of the primary data store 102 is constant.

Where the size of primary data store 102 is constant, it may still be desired, e.g., to increase the size of secondary data store 115 (in the case of shared deleted data storage) or deleted data store 116 (in the case of separate deleted data storage), in order to increase the storage capacity for holding data deleted from primary data store 102. By doing so, the need to remove 255, 355 (permanently delete) contents of deleted data store 116, 117 (viz., data deleted from primary data store 102) may be reduced. As an example, if a storage system 110, 111 were administered by a commercial storage service provider and a user of a storage device having a primary data store 102 were a customer of the service provider, the service provider could permit the user to request from the service provider more storage space for secondary data store 115 (in the case of shared deleted data storage) or for deleted data store 116 (in the case of separate deleted data storage). As another example, an arrangement could be set up whereby the size of secondary data store 115 or deleted data store 116 is increased automatically in order to retain certain contents of deleted data store 116, 117 for a longer time than would otherwise occur. For example, contents of a certain type or satisfying a certain criterion (e.g. specifically named files or files of a specified file type) could be automatically retained for an extended period of time, with the secondary data store 115 or deleted data store 116 automatically increasing if necessary to accommodate these contents. The criterion could be set by the system and/or by the user, and could involve multiple criteria (e.g. prioritized or using a weighted average). The extension of the retention time of the certain contents could be temporary, permanent, or fixed and subject to change.

In addition to increasing the storage capacity for deleted data, it is possible to decrease the storage capacity for deleted data, as this too may be desired, e.g. to reduce storage costs. Thus, a user may be permitted to effect a reduction in the storage capacity of secondary data store 115 (in the case of shared deleted data storage) or of deleted data store 116 (in the case of separate deleted data storage). Again, an arrangement could be put in place whereby the size of secondary data store 115 (in the case of shared deleted data storage) or of deleted data store 116 (in the case of separate deleted data storage) is decreased automatically according to a criterion. For example, the size of secondary data store 115 or deleted data store 116 could be decreased automatically if the space occupied by the contents of secondary data store 115 or deleted data store 116 decreases below a certain threshold storage capacity, or if the time that has passed after the size of secondary data store 115 or deleted data store 116 has been increased exceeds a certain threshold). If necessary, contents could be removed 255, 355 from deleted data store 116, 117 in order to accommodate the decrease in size thereof. The removal 255, 355 of the contents could be performed automatically or by a user (e.g. after being prompted), e.g. based on criteria (as discussed above with reference to the scenarios illustrated in FIGS. 2B and 3C) or based on a user selection. Variations, permutations and combinations of aspects of the size adjustment of secondary data store 115 or deleted data store 116 such as discussed above may be implemented, as will be appreciated by one of ordinary skill in the art.

Figure 4A:
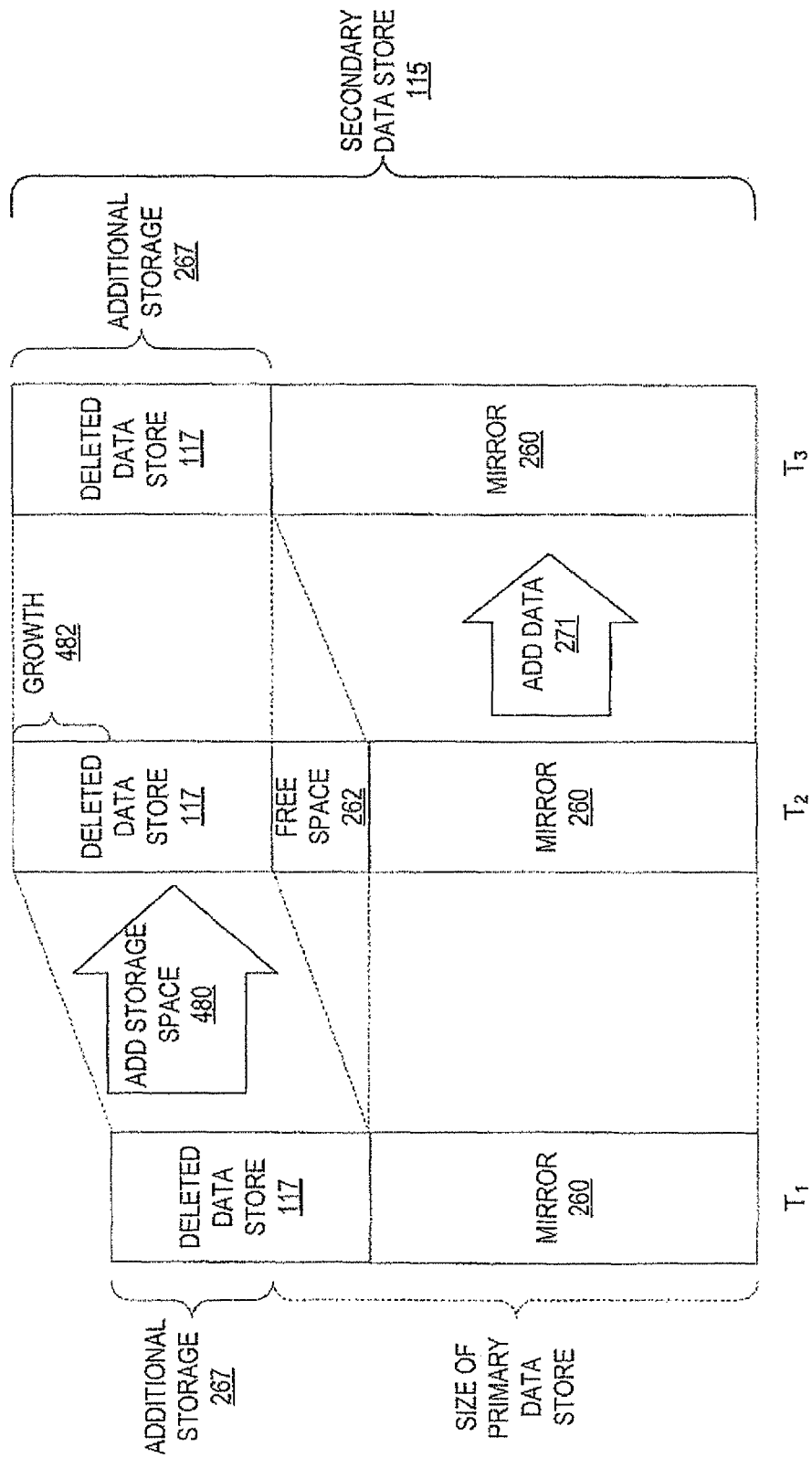
FIGS. 4A and 4B illustrate adjustments of the size of the deleted data store of FIGS. 2A-2C and 3A-3C, respectively.
Figure 4B:
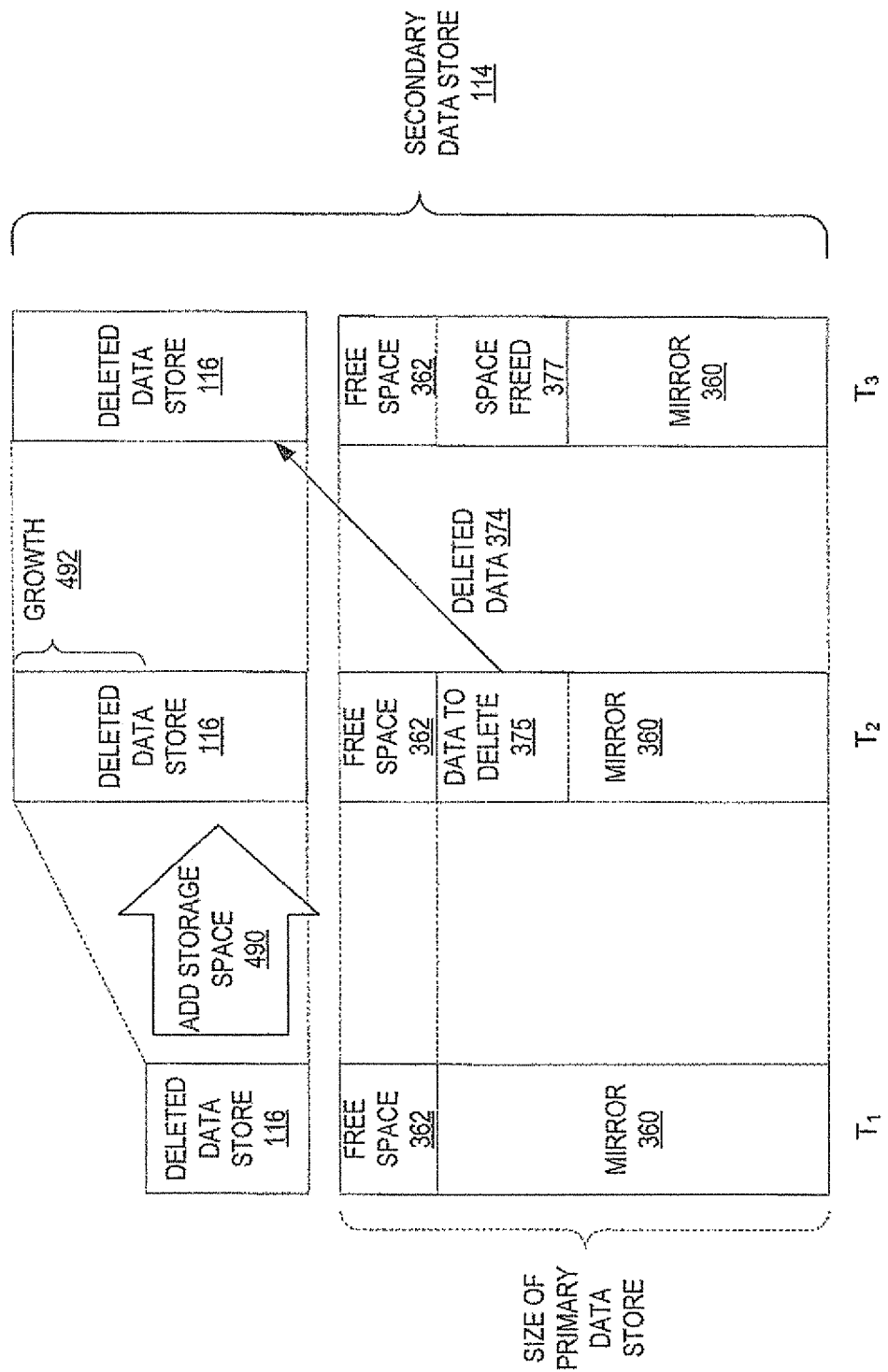

FIG. 4A illustrates a scenario in which the size of secondary data store 115 of FIGS. 1B and 2A-2C is increased, and data is added to primary data store 102 and hence to mirror 260 of secondary data store 115. FIG. 4B illustrates a scenario in which the size of deleted data store 116 of FIGS. 1A and 3A-3C is increased, and data is deleted from primary data store 102 and hence deleted from mirror 360 of secondary data store 114 and added to deleted data store 116.

FIG. 4A illustrates secondary data store 115 before the size of secondary data store 115 is increased (T1), after the size of secondary data store 115 is increased but before new data is added 271 (T2), and after new data is added 271 (T3). The relative size of primary data store 102 is indicated by the dashed bracket. At T1, deleted data store 117 has a storage capacity beyond that of additional storage 267, reflecting the fact that primary data store 102 has free space 265 (see FIG. 2A) (hence mirror 260 is not as large as it could be), and also reflecting the fact that deleted data store 117 is full (if deleted data store 117 were not full, the unoccupied portion of deleted data store 117 over and above additional storage 267 would be released to become free space (262), which would be shown in the figure). When extra storage space is added 480 to secondary data store 115, the size of deleted data store 117 increases by growth 482 (T2). That is, the added storage space (growth 482) is in effect added to additional storage 267. But until more data is added to deleted data store 117, the extra space added thereto (viz., growth 482) is unoccupied. Therefore, deleted data store 117 now has unoccupied space (equal in size to growth 482) over and above the size of additional storage 267. Therefore, that unoccupied space is released to become free space 262, and so the size of deleted data store 117 decreases to the size it had prior to addition 480 thereto of growth 482. This is the situation shown in FIG. 4A at T2 (size of growth 482 equals size of free space 262). When new data is added to primary data store 102 (addition operation not shown), copies of the new data are added 271 to mirror 260, so that mirror 260 takes over free space 262 and, depending on the size of the new data, mirror 260 may or may not need to take over additional space from deleted data store 117. In the figure (at T3), it is shown that the size of the added data equals the size of free space 262 (hence equals the size of the growth 482), as evidenced by the fact that the size of mirror 260 at T3 equals the sum of the size of mirror 260 at T2 and the size of free space 262 at T2. In such case, there is no need to take over additional space from deleted data store 117. As seen at T3, the increase in size of mirror 260 has required a concomitant decrease in size (of the same magnitude as the increase) in the rest of secondary data store 115; in this case, that decrease in size has been effected by taking space from free space 262 alone, not also from deleted data store 117. However, in the case that free space 262 were not sufficient to accommodate the new data to be added to mirror 260, contents of deleted data store 117 would need to be removed 255 in order to release space therefrom to be made available to mirror 260 to accommodate the new data. Such removal 255 of contents from deleted data store 117 may be carried out in accordance with a criterion, as was explained above with reference to FIG. 2B. In any event, because secondary data store 115 (in particular deleted data store 117 therein) has been enlarged, the requirement to remove 255 contents of deleted data store 117 is eased, e.g. removal 255 of the contents may be carried out less frequently.

The scenario in which the size of secondary data store 115 of FIGS. 1B and 2A-2C is increased, and data is deleted from primary data store 102 may be deduced from FIGS. 2C and 4A and the discussion given herein.

FIG. 4B illustrates secondary data store 114 and deleted data store 116 (FIGS. 1A, 3A-3C) before the size of deleted data store 116 is increased (T1), after the size of deleted data store 116 is increased but before data is deleted (T2), and after data is deleted from mirror 360 (T3). The relative size of primary data store 102 is indicated by the dashed bracket. At T1, secondary data store 116 has free space 362, reflecting the fact that primary data store 102 has free space 365 (see FIG. 3A), but in this case (i.e. the separate deleted data storage embodiment, shown in FIGS. 3A-3C) free space 362 of secondary data store 114 is not available to deleted data store 116. When extra storage space is added 490 to deleted data store 116, the size of deleted data store 116 increases by growth 492 (T2). Until more data is added to deleted data store 116, the extra space added 490 thereto (viz., growth 492) is unoccupied. When data is deleted from primary data store 102 (deletion operation not shown), copies of the deleted data previously stored in mirror 360 are transferred from mirror 360 to enlarged deleted data store 116 (or equivalently, the data deleted from primary data store 102 is also deleted 374 from mirror 360 of secondary data store 114 and added to deleted data store 116). Consequently, mirror 360 decreases in size (or equivalently, releases space no longer occupied), and free space 262 of secondary data store 114 increases in size correspondingly, as shown by the exchange of places of the solid and dashed horizontal lines in secondary data store 114 that occurs as we move from T2 to T3: the space 375 (storage capacity) in mirror 360 occupied at time T2 by the data to be deleted ("data to delete") is effectively transferred or released from mirror 360 to become free space 377 ("space freed"), which outcome is shown at time T3. Depending on the size of the data deleted from primary data store 102, it may or may not be necessary to remove 355 contents from deleted data store 116 to accommodate therein the data deleted from primary data store 102. (Although FIG. 4B is not necessarily drawn to scale, assuming it is drawn to scale, it would appear to show, although not explicitly, that the amount of space released by mirror 360 is not larger than growth 492 (i.e. the amount of space gained by deleted data store 116), in which case it would not be necessary to remove 355 contents from deleted data store 116). In any event, because deleted data store 116 has been enlarged, the requirement to remove 355 contents of deleted data store 116 is eased, e.g. removal 355 of the contents may be carried out less frequently.

The scenario in which the size of deleted data store 116 of FIGS. 1A and 3A-3C is increased, and data is added to primary data store 102 may be deduced from FIGS. 3B and 4B and the discussion given herein.

The scenarios in which the size of secondary data store 115 (shared deleted storage embodiment, FIGS. 1B and 2A-2C) or the size of deleted data store 116 (separate deleted storage embodiment, FIGS. 1A and 3A-3C) are decreased, and in which data is added to or deleted from primary data store 102, may be deduced from the figures and description provided herein.

Figure 5:
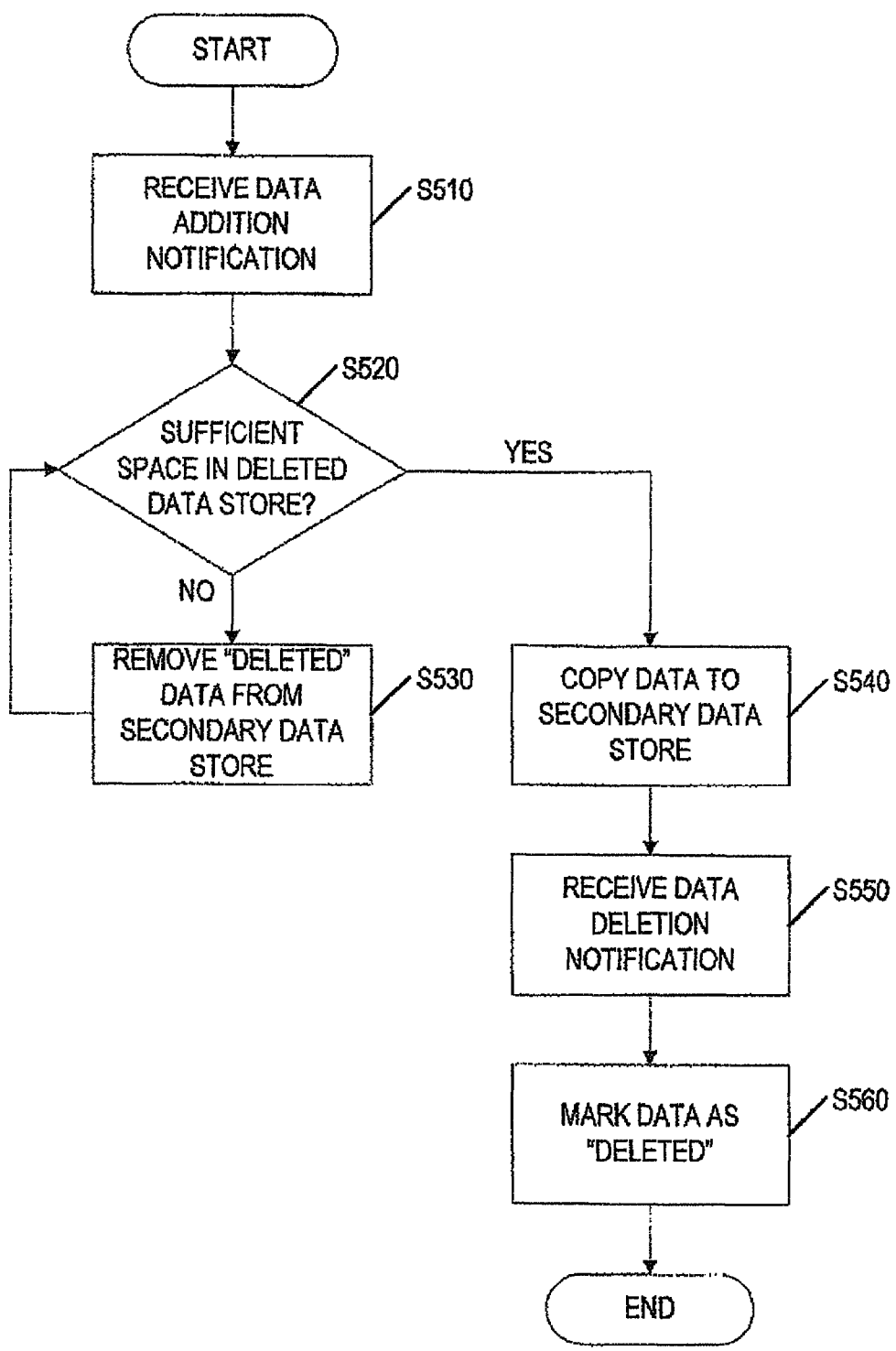
FIG. 5 illustrates a method of backing up a data store, applicable to the storage system shown in FIGS. 2A-2C, according to example embodiments.
Figure 6A:
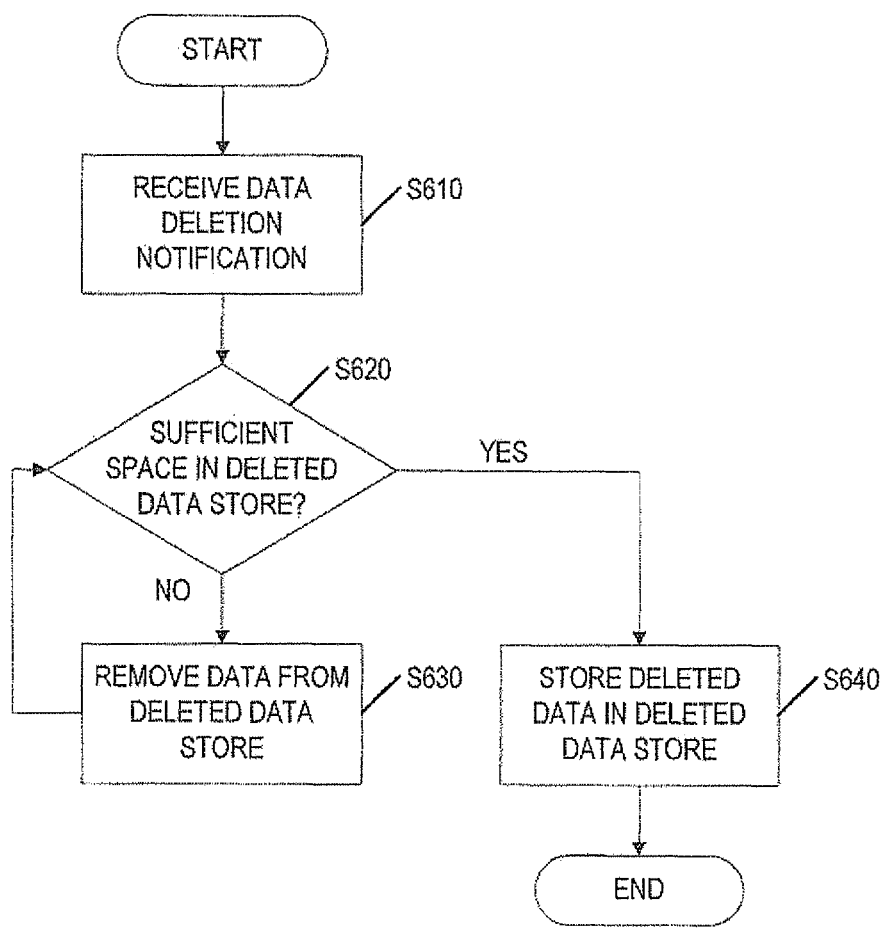
FIGS. 6A and 6B illustrate methods of backing up a data store, applicable to the storage system shown in FIGS. 3A-3C, according to alternative example embodiments.
Figure 6B:
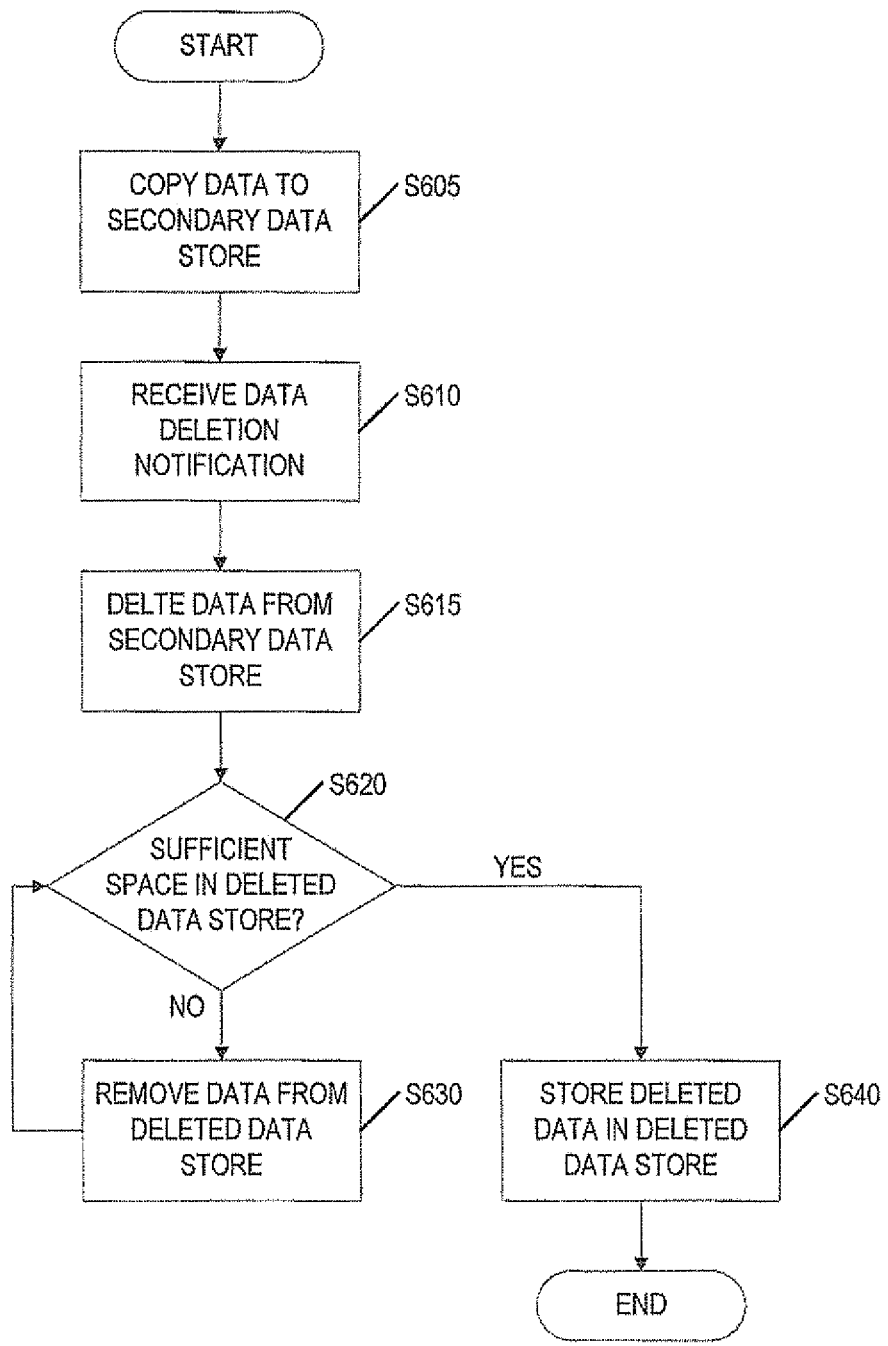

FIGS. 5, 6A and 6B illustrate methods of backing up a data store, which may be performed using the systems described hereinabove. FIG. 5 illustrates such a method that may be performed using the integrated deleted storage system (FIGS. 1B, 2A-2C), while FIGS. 6A and 6B illustrate such methods that may be performed using the separated deleted storage system (FIGS. 1A, 3A-3C).

FIG. 5 will now be described with reference to a shared deleted storage system such as that illustrated in FIGS. 1B and 2A-2C.

At step S510, data management application 112 receives 108 (FIG. 1A) a notification that specified data has been added to primary data store 102. At step S520, data management application 112 determines whether sufficient free space 262 exists in secondary data store 115 to accommodate the specified data that was added to primary data store 102. If sufficient free space exists ("Yes"), then at step S540 data management application 112 copies 271 the specified data to mirror 260 of secondary data store 115 (i.e. writes the specified data to secondary data store 115 as data assigned to mirror 260).

If sufficient free space does not exist ("No") at step S520, then the flow proceeds to step S530 at which data removal application 124 removes 255 from secondary data store 115, in accordance with a criterion, data stored in secondary data store 115 but marked as deleted (i.e. data stored in secondary data store 115 and assigned to deleted data store 117). As explained above, removing 255, from secondary data store 115, data marked as deleted (or, equivalently, removing 255 data from deleted data store 117) releases the space occupied by the now-removed data to become free space, thus increasing the amount of free space in secondary data store 115. The released free space is available to mirror 260. Step S530 is iterated in a loop with step S520 to repeatedly remove 255 data from deleted data store 117 until sufficient space is released to accommodate the specified data added to primary data store 102. When sufficient free space exists, the flow proceeds to step S540 at which data management application 112 copies 271 the specified data to mirror 260 of secondary data store 115 (i.e. writes 271 the specified data to secondary data store 115 as data assigned to mirror 260). The feedback loop between steps S530 and S520 is optional in the sense that step S530 may be a single step in which a large enough amount of data is (determined at the outset and) removed from deleted data store 117 to release sufficient space to accommodate the specified data added to the primary data store 102.

At step S550, data management application 112 receives 108 a notification that the specified data (that was added to primary data store 102 as notified in step S510) has been deleted from primary data store 102. At step S560, data management application 112 marks the specified data, (that at step 540 was written 271) in mirror 260 of secondary data store 115, as deleted, i.e. assigns the specified data to deleted data store 117, or effectively transfers the specified data from mirror 260 to deleted data store 117. (Note that in step S550 notification is received that the specified data has been deleted from the primary data store 102, while in step S560, an identical copy of that specified data, which was copied to secondary data store 115 in step S540 and is located in secondary data store 115, is marked as deleted. (As mentioned above, with regard to the backing up of data, e.g. in secondary data store 115 or in deleted data store 117, this disclosure speaks interchangeably of storing or writing copies of original data in/to a second location, storing, writing or copying the original data in/to a second location, storing or writing data identical (or corresponding) to the original data in/to a second location, and the like.))

FIG. 6A will now be described with reference to a separated deleted storage system such as that illustrated in FIGS. 1A and 3A-3C. At step S610, data management application 112 receives 108 a notification that specified data has been deleted from primary data store 102. At step S620, data management application 112 determines whether sufficient free space exists in deleted data store 116 to accommodate the specified data that was deleted from primary data store 102. If sufficient free space exists ("Yes"), then at step S640 data management application 112 stores (writes) the specified data in deleted data store 116 (i.e. 374, FIG. 3C).

If sufficient free space does not exist ("No") at step S620, then the flow proceeds to step S630 at which data removal application 124 removes 355 data from deleted data store 116, in accordance with a criterion. Removing 355 data from deleted data store 116 increases the amount of free space in deleted data store 116. Step S630 is iterated in a loop with step S620 to repeatedly remove 355 data from deleted data store 116 until sufficient space is released to accommodate the specified data deleted from primary data store 102. When sufficient free space exists, the flow proceeds to step S640 at which data management application 112 stores (writes) the specified data in deleted data store 116 (i.e. 374). The feedback loop between steps S630 and S620 is optional in the sense that step S630 may be a single step in which a large enough amount of data is (determined at the outset and) removed 355 from deleted data store 116 to release sufficient space to accommodate the specified data deleted from primary data store 102.

FIG. 6B illustrates a method differing from that illustrated in FIG. 6A by the addition of two steps, namely, step S605 (which occurs prior to step S610) and step S615 (which occurs after step S610). In step S605, prior to receipt 108 by data management application 112 of a notification that specified data has been deleted from primary data store 102, the specified data is copied to mirror 360 of secondary data store 114 (i.e. 372, FIG. 3B). This is done routinely in order to back up the data stored in primary data store 102. In step S615, after data management application 112 receives 108 a notification that the specified data has been deleted from primary data store 102, data management application 112 deletes the specified data from mirror 360 of the secondary data store 114 (i.e. 374, FIG. 3C). This is also done routinely so that mirror 360 holds an exact backup copy of the data stored in primary data store 102. Although in the figure, step S615 is shown as occurring between steps S610 and S620, step S615 may occur at any point in the flow after step S610.

As noted above, there may be a delay between the time at which data is added to or deleted from primary data store 102 and the time at which the same change is made to the secondary data store 114, for various reasons. When such a delay occurs and, during the course of the delay, data is added to primary data store 102 and then deleted from primary data store 102, that data would not undergo the otherwise routine steps S605 and S615 of being copied to mirror 360 of secondary data store 114 and deleted from mirror 360 of secondary data store 114, respectively.

As will be understood by one of ordinary skill in the art, in some cases, steps of the above-described methods may be performed in sequences other than described.

As will be understood by one of ordinary skill in the art, certain embodiments disclosed herein (e.g. the methods set forth above) may be implemented by program code stored on a computer readable medium. Such a computer readable medium, which may be of any type suitable for the purposes described herein, is considered to be included within the scope of the present invention.

In view of the above description, the following aspects of the example embodiments described herein are noted.

According to a first aspect of the present invention, a method of backing up a data store is provided. The method includes receiving a notification of deletion of first data from a primary data store; determining whether sufficient free space exists in a deleted data store to store therein the first data; if sufficient free space exists in the deleted data store to store therein the first data, storing the first data in the deleted data store; and if sufficient free space does not exist in the deleted data store to store therein the first data, (a) removing data from the deleted data store in accordance with a criterion, thereby increasing an amount of free space in the deleted data store, in order to accommodate the first data in the deleted data store, and (b) storing the first data in the deleted data store.

According to a second aspect of the present invention, the method according to the first aspect further includes prior to the receiving step, copying the first data to a secondary data store; and subsequent to the receiving step, deleting the first data from the secondary data store.

According to a third aspect of the present invention, a storage system is provided. The storage system includes a data management application operative to perform the following operations: to receive notifications of deletion of data from a primary data store; upon receipt of a notification of deletion of first data from a primary data store, to determine whether sufficient free space exists in a deleted data store to store therein the first data; if sufficient free space exists in the deleted data store to store therein the first data, to store the first data in the deleted data store; and if sufficient free space does not exist in the deleted data store to store therein the first data, (a) to remove data from the deleted data store in accordance with a criterion, thereby increasing an amount of free space in the deleted data store, in order to accommodate the first data in the deleted data store, and (b) to store the first data in the deleted data store.

According to a fourth aspect of the present invention, in the system according to the third aspect, the data management application is further operative to perform the following operations: to receive copies of data added to the primary data store; and upon receipt of a copy of second data added to the primary data store, to store the copy of the second data in a secondary data store.

According to a fifth aspect of the present invention, the system according to the third aspect further includes system the deleted data store and/or a secondary data store for storing copies of data stored in the primary data store.

According to a sixth aspect of the present invention, in the system according to the fourth aspect, the data management system is further operative to store the copy of the second data in the secondary data store upon operational connection of the primary data store to the data management application.

According to a seventh aspect of the present invention, there is provided a method of backing up a data store. The method includes receiving a notification that first data has been added to a primary data store; determining whether sufficient free space exists in a secondary data store to store therein the first data; if sufficient free space exists in the secondary data store to store therein the first data, copying the first data to the secondary data store; if sufficient free space does not exist in the secondary data store to store therein the first data, (a) removing from the secondary data store, in accordance with a criterion, data stored in the secondary data store but marked as deleted, thereby increasing an amount of free space in the secondary data store, in order to accommodate the first data in the secondary data store, and (b) copying the first data to the secondary data store; receiving a notification of deletion of the first data from the primary data store; and marking the first data in the secondary data store as deleted. According to the method, the secondary data store has a storage capacity larger than a storage capacity of the primary data store.

According to a eighth aspect of the present invention, there is provided a storage system. The system includes a secondary data store having a storage capacity larger than a storage capacity of a primary data store; and a data management application. The data management operation is operative to perform the following operations: (A) to receive notifications of addition of data to the primary data store and notifications of deletion of data from the primary data store; (B) upon receipt of a notification of addition of first data to a primary data store: (i) to determine whether sufficient free space exists in the secondary data store to store therein the first data; (ii) if sufficient free space exists in the secondary data store to store therein the first data, to copy the first data to the secondary data store; and (iii) if sufficient free space does not exist in the secondary data store to store therein the first data, (a) to remove from the secondary data store, in accordance with a criterion, data stored in the secondary data store but marked as deleted, thereby increasing an amount of free space in the secondary data store, in order to accommodate the first data in the secondary data store, and (b) to copy the first data to the secondary data store. The data management operation is further operative to perform the following operation: (C) upon receipt of a notification of deletion of the first data from a primary data store, to mark the first data in the secondary data store as deleted.

According to any of the above-mentioned first through sixth aspects of the present invention, the storage capacity of the deleted data store may be increased or decreased.

According to any of the above-mentioned seventh and eighth aspects of the present invention, the storage capacity of the secondary data store may be increased or decreased.

According to any of the above aspects of the present invention, the removing of data from the deleted data store in accordance with a criterion includes one or more of the following: removing data from the deleted data store based on whether a duration of time that has elapsed since a given operation was last performed on data exceeds a given threshold; removing data from the deleted data store based on a type of file in which data is contained; removing data from the deleted data store based on whether a size of a file in which data is contained exceeds a given threshold; removing data from the deleted data store based on an original location of a file in which data is contained; removing data from the deleted data store based on content of metadata of a file in which data is contained; and removing data from the deleted data store based on a prioritization, determined by a user, of data to be deleted.

The articles "a" and "an" are used herein to refer to one or to more than one (i.e., to at least one) of the grammatical object of the article, depending on the context. By way of example, depending on the context, "an element" can mean one element or more than one element. The term "including" and grammatical variants thereof are used herein to mean, and are used interchangeably with, the phrase "including but not necessarily limited to" and grammatical variants thereof. The term "such as" is used herein to mean, and is used interchangeably, with the phrase "such as but not necessarily limited to".

While certain exemplary embodiments have been described herein, it should be understood that the present invention is not limited by those embodiments or the details thereof. On the contrary, it is apparent that many modifications and improvements of the disclosed embodiments may be devised by those skilled in the art, in view of the description provided herein, without departing from the spirit and scope of the present invention. All such modifications and improvements are intended to fall within the spirit and scope of the claims; the scope of the claims is to be accorded the broadest interpretation so as to encompass all such modifications and improvements. Accordingly, the foregoing discussion is intended to be illustrative only and not limiting. It is understood that within the spirit and scope of the claims, the present invention may be practice otherwise than as specifically described. The present invention is to be limited only by the appended claims.

What is claimed is:

1. A method of backing up a data store comprising:
in a storage system having a controller, the data store operative to interface with a host device and the host device operative to communicate with a primary removable data store, the controller:
receiving a notification originating from the host device of deletion of first data from a primary removable data store, the primary removable data store configured to be coupled to and uncoupled from the host device as a removable storage device;
wherein when the primary removable data store is coupled with the host:
determining whether sufficient free space exists in a deleted data store to store therein the first data, wherein the deleted data store is configured to store data deleted from the primary removable data store, and wherein the deleted data store is separate and apart from the primary removable data store so as to maximize storage space for non-deleted data in the primary removable data store;
if sufficient free space exists in the deleted data store to store therein the first data, storing the first data in the deleted data store so as to provide recoverable deleted data storage for the primary removable data store;
if sufficient free space does not exist in the deleted data store to store therein the first data,
(a) removing data from the deleted data store in accordance with a criterion, thereby increasing an amount of free space in the deleted data store, in order to accommodate the first data in the deleted data store, and
(b) storing the first data in the deleted data store; and
determining whether sufficient free space exists in a secondary data store to store therein the first data, the secondary data store configured to mirror data in the primary removable data store.

2. The method of claim 1, further comprising:
prior to the receiving step, copying the first data to a secondary data store; and subsequent to the receiving step, deleting the first data from the secondary data store.

3. The method of claim 1, wherein the removing of data from the deleted data store in accordance with a criterion includes one or more of the following:
removing data from the deleted data store based on whether a duration of time that has elapsed since a given operation was last performed on data exceeds a given threshold;
removing data from the deleted data store based on a type of file in which data is contained;
removing data from the deleted data store based on whether a size of a file in which data is contained exceeds a given threshold;
removing data from the deleted data store based on an original location of a file in which data is contained;
removing data from the deleted data store based on content of metadata of a file in which data is contained; and
removing data from the deleted data store based on a prioritization, determined by a user, of data to be deleted.

4. The method of claim 1, wherein a storage capacity of the deleted data store may be increased or decreased.

5. A storage system operative to interface with a host device, the host device operative to communicate with a primary removable data store, the storage system comprising:
the primary removable data store configured to be coupled to and uncoupled from the host device as a removable storage device;
a secondary data store configured to mirror data in the primary removable data store;
a deleted data store configured to store data deleted from the primary removable data store, and configured to be separate and apart from the removable data store so as to maximize storage space for non-deleted data in the removable data store; and
a controller;
wherein when the primary removable data store is coupled with the host, the controller is configured to:
receive notifications originating from the host device of deletion of data from the primary removable data store;
determine, upon receipt of a notification of deletion of first data from the primary removable data store, whether sufficient free space exists in the deleted data store to store therein the first data;
remove data from the deleted data store in accordance with a specified criterion in order to make space for the first data if the deleted data store does not have sufficient free space to accommodate the first data;
store the first data in the deleted data store to provide recoverable deleted data storage for the primary removable data store; and
delete the first data from the secondary data store upon notification that the first data has been deleted from the primary removable data store, so as to mirror data in the primary removable data store.

6. The storage system of claim 5, wherein the controller is further operative:
to receive copies of data added to the primary removable data store; and
upon receipt of a copy of second data added to the primary removable data store, to store the copy of the second data in a secondary data store.

7. The storage system of claim 5, further comprising
(a) the deleted data store and
(b) a secondary data store for storing copies of data stored in the primary removable data store.

8. The storage system of claim 6, wherein the storage system is further operative to store the copy of the second data in the secondary data store upon operational connection of the primary removable data store to the data management application.

9. The storage system of claim 5, wherein the removing of data from the deleted data store in accordance with a criterion includes one or more of the following:
removing data from the deleted data store based on whether a duration of time that has elapsed since a given operation was last performed on data exceeds a given threshold;
removing data from the deleted data store based on a type of file in which data is contained;
removing data from the deleted data store based on whether a size of a file in which data is contained exceeds a given threshold;
removing data from the deleted data store based on an original location of a file in which data is contained;

removing data from the deleted data store based on content of metadata of a file in which data is contained; and removing data from the deleted data store based on a prioritization, determined by a user, of data to be deleted.

10. The storage system of claim 5, wherein a storage capacity of the deleted data store may be increased or decreased.

11. A method of backing up a data store in a storage system having a controller, the data store operative to interface with a host device and the host device operative to communicate with a primary removable data store, the method comprising:
    receiving, by the controller, a notification originating from the host device that first data has been added to a primary removable data store, the primary removable data store configured to be coupled to and uncoupled from the host device as a removable storage device;
    wherein when the primary removable data store is coupled with the host:
        determining, by the controller, whether sufficient free space exists in a secondary data store to store therein the first data, the secondary data store configured to mirror data in the primary removable data store;
        if sufficient free space exists in the secondary data store to store therein the first data, the copying, by the controller, the first data to the secondary data store;
        if sufficient free space does not exist in the secondary data store to store therein the first data,
            (a) removing, by the controller, from the secondary data store, in accordance with a criterion, data stored in the secondary data store but marked as deleted, thereby increasing an amount of free space in the secondary data store, in order to accommodate the first data in the secondary data store;
            (b) copying, by the controller, the first data to the secondary data store;
            (c) receiving, by the controller, a notification of deletion of the first data from the primary removable data store; and
            (d) marking, by the controller, the first data in the secondary data store as deleted, wherein the secondary data store has a storage capacity larger than a storage capacity of the primary removable data store.

12. The method of claim 11, wherein the removing of data from the secondary data store in accordance with a criterion includes one or more of the following:
    removing data from the secondary data store based on whether a duration of time that has elapsed since a given operation was last performed on data exceeds a given threshold;
    removing data from the secondary data store based on a type of file in which data is contained;
    removing data from the secondary data store based on whether a size of a file in which data is contained exceeds a given threshold;
    removing data from the secondary data store based on an original location of a file in which data is contained;
    removing data from the secondary data store based on content of metadata of a file in which data is contained; and
    removing data from the secondary data store based on a prioritization, determined by a user, of data to be deleted.

13. The method of claim 11, wherein a storage capacity of the secondary data store may be increased or decreased.

14. A storage system operative to interface with a host device, the host device operative to communicate with a primary removable data store, the storage system, comprising:
    the primary removable data store configured to be coupled to and uncoupled from the host device as a removeable storage device;
    a secondary data store configured to mirror data in the primary removable data store and configured to have a storage capacity larger than a storage capacity of the primary removable data store;
    a deleted data store configured to store data deleted from the primary removable data store, and configured to be separate and apart from the removable data store so as to maximize storage space for non-deleted data in the removable data store; and
    a controller;
    wherein when the primary removable data store is coupled with the host, the controller configured to:
        (A) receive notifications originating from the host device of addition of data to the primary removable data store and receive notifications originating from the host device of deletion of data from the primary removable data store;
        (B) upon receipt of the notification of addition of first data to a primary removable data store:
            (i) determine whether sufficient free space exists in the secondary data store to store therein the first data;
            (ii) if sufficient free space exists in the secondary data store to store therein the first data, to copy the first data to the secondary data store; and
            (iii) if sufficient free space does not exist in the secondary data store to store therein the first data,
                (a) to remove from the secondary data store, in accordance with a criterion, data stored in the secondary data store but marked as deleted, thereby increasing an amount of free space in the secondary data store, in order to accommodate the first data in the secondary data store, and
                (b) to copy the first data to the secondary data store; and
        (C) upon receipt of the notification of deletion of the first data from a primary removable data store, to mark the first data in the secondary data store as deleted.

15. The storage system of claim 14, wherein the removing of data from the secondary data store in accordance with a criterion includes one or more of the following:
    removing data from the secondary data store based on whether a duration of time that has elapsed since a given operation was last performed on data exceeds a given threshold;
    removing data from the secondary data store based on a type of file in which data is contained;
    removing data from the secondary data store based on whether a size of a file in which data is contained exceeds a given threshold;
    removing data from the secondary data store based on an original location of a file in which data is contained;
    removing data from the secondary data store based on content of metadata of a file in which data is contained; and
    removing data from the secondary data store based on a prioritization, determined by a user, of data to be deleted.

16. The storage system of claim 14, wherein a storage capacity of the secondary data store may be increased or decreased.

* * * * *

UNITED STATES PATENT AND TRADEMARK OFFICE
CERTIFICATE OF CORRECTION

PATENT NO.        : 8,412,905 B2                              Page 1 of 1
APPLICATION NO.   : 12/348005
DATED             : April 2, 2013
INVENTOR(S)       : Donald Ray Bryant-Rich It is certified that error appears in the above-identified patent and that said Letters Patent is hereby corrected as shown below:

In the Claims

Claim 11, Column 23, line 23, delete "the" between "data" and "copying" and insert --then--.

Signed and Sealed this
Twenty-seventh Day of May, 2014

Michelle K. Lee
*Deputy Director of the United States Patent and Trademark Office*